United States Patent
Matsuura

(10) Patent No.: US 9,709,678 B2
(45) Date of Patent: Jul. 18, 2017

(54) LASER RADAR DEVICE, OBJECT DETECTING METHOD

(71) Applicant: Yoshio Matsuura, Aichi (JP)

(72) Inventor: Yoshio Matsuura, Aichi (JP)

(73) Assignee: OMRON AUTOMOTIVE ELECTRONICS CO., LTD., Aichi (JP)

( * ) Notice: Subject to any disclaimer, the term of this patent is extended or adjusted under 35 U.S.C. 154(b) by 365 days.

(21) Appl. No.: 14/595,377

(22) Filed: Jan. 13, 2015

(65) Prior Publication Data

US 2015/0204980 A1    Jul. 23, 2015

(30) Foreign Application Priority Data

Jan. 17, 2014  (JP) .................. 2014-006671

(51) Int. Cl.
*G01C 3/08* (2006.01)
*G01S 17/50* (2006.01)
(Continued)

(52) U.S. Cl.
CPC .............. *G01S 17/50* (2013.01); *B60W 30/08* (2013.01); *G01S 7/487* (2013.01); *G01S 7/4868* (2013.01);
(Continued)

(58) Field of Classification Search
CPC ........ G01S 17/10; G01S 17/42; G01S 17/936; G01S 17/50; G01S 7/487; G01S 7/4868; G01S 2007/4975; B60W 30/08
(Continued)

(56) References Cited

U.S. PATENT DOCUMENTS 5,831,717 A * 11/1998 Ikebuchi ................. G01S 7/484
                                                              180/169
6,452,666 B1 * 9/2002 Barna ...................... G01C 3/08
                                                              356/5.01
(Continued)

FOREIGN PATENT DOCUMENTS

DE        101 57 012 A1    9/2002
DE   10 2012 211 222 A1    1/2013
(Continued)

OTHER PUBLICATIONS

Office Action in counterpart German Patent Application No. 10 2015 200 649.2 issued Oct. 19, 2016 (16 pages).
(Continued)

*Primary Examiner* — Mark Hellner
(74) *Attorney, Agent, or Firm* — Osha Liang LLP

(57) ABSTRACT

A laser radar device includes: a projector projecting measuring light to a forward direction of a vehicle multiple times during a predetermined detection period; light receiving elements receiving reflected light of the measuring light from detection areas having different directions in a horizontal direction; a measurement section selecting at least one of light reception signals from the light receiving elements and measuring a light reception value by sampling the selected light reception signal; an integrator integrating the light reception values of the light reception signals from the identical light receiving element at an identical sampling clock time; a detector detecting an obstacle in each detection period based on the integrated light reception value; and a sensitivity controller increasing the number of times of integrating the light reception values of at least a part of the light receiving elements, under predetermined conditions.

7 Claims, 35 Drawing Sheets

(51) Int. Cl.
  *B60W 30/08* (2012.01)
  *G01S 17/10* (2006.01)
  *G01S 17/42* (2006.01)
  *G01S 17/93* (2006.01)
  *G01S 7/486* (2006.01)
  *G01S 7/487* (2006.01)
  *G01S 7/497* (2006.01)

(52) U.S. Cl.
  CPC .............. *G01S 17/10* (2013.01); *G01S 17/42* (2013.01); *G01S 17/936* (2013.01); *G01S 2007/4975* (2013.01)

(58) Field of Classification Search
  USPC ........................................................ 356/4.01
  See application file for complete search history.

(56) References Cited

U.S. PATENT DOCUMENTS 6,710,859 B2* 3/2004 Shirai ..................... G01S 7/484
                                                              180/169

2003/0090647 A1* 5/2003 Isogai ..................... G01C 3/22
                                                              356/4.01
2008/0007446 A1   1/2008 Nakamura
2008/0224893 A1   9/2008 Mitani
2009/0045999 A1* 2/2009 Samukawa ............... B60T 7/22
                                                              342/70

FOREIGN PATENT DOCUMENTS

| JP | H07-167958 A | 7/1995 |
| JP | H07-191148 A | 7/1995 |
| JP | 2002-181937 A | 6/2002 |
| JP | 2008-14722 A | 1/2008 |
| JP | 2012-063236 A | 3/2012 |

OTHER PUBLICATIONS

Notification of Reasons for Refusal issued in corresponding Japanese Application No. 2014-006671, mailed on Mar. 9, 2017 (21 pages).

* cited by examiner

Pattern B1
Pattern B2
Pattern B3
Pattern B4
Pattern B5

FIG. 38

Pattern C1  Pattern C2  Pattern C3  Pattern C4  Pattern C5

FIG. 46

Pattern D1, Pattern D2, Pattern D3, Pattern D4, Pattern D5

LASER RADAR DEVICE, OBJECT DETECTING METHOD

CROSS-REFERENCE TO RELATED APPLICATION

This application is based on Japanese Patent Application No. 2014-006671 filed with the Japan Patent Office on Jan. 17, 2014, the entire contents of which are incorporated herein by reference.

FIELD

The disclosure relates to a laser radar device, an object detecting method, and a program, particularly to a laser radar device that can properly set sensitivity for a front direction of a vehicle, an object detecting method, and a program.

BACKGROUND

Conventionally, there is proposed a technology of improving detection accuracy of a laser radar device that projects a laser beam to a forward direction of a vehicle to simultaneously receive reflected light from different directions in a horizontal direction using a plurality of light receiving elements.

For example, according to one proposal, a plurality of light receiving elements are selected with any combination, and light reception signals output from the selected light receiving elements are added and output to increase light reception sensitivity. According to one proposal, in the case where vehicle speed exceeds a predetermined threshold, a range of the light receiving element to be selected is narrowed to narrow a view angle, the plurality of light receiving elements are selected while shifted one by one, and the light reception signals are added, whereby the light reception sensitivity is increased without degrading resolution in the horizontal direction. According to one proposal, in the case of a determination that a reflector does not exist in front of the vehicle, the plurality of light receiving elements are shifted and selected so as not to be overlapped with each other, and the light reception signals are added, whereby the light reception sensitivity is increased while the resolution in the horizontal direction is decreased, and high-speed scanning is performed (for example, see Japanese Unexamined Patent Publication No. 7-191148).

Conventionally, in a vehicle laser radar device that horizontally scans a pulsed laser beam, there is also proposed a technology of restraining intensity of the laser beam in order to secure safety of a pedestrian or a passenger in the vehicle in front of an own vehicle.

For example, according to one proposal, the intensity of the laser beam can be controlled in each angle at which the laser beam is output, the intensity of the next laser beam is decreased in a direction in which the intensity of the light reception signal exceeds an upper limit, and the intensity of the next laser beam is increased in a direction in which the intensity of the light reception signal is less than or equal to the upper limit. According to one proposal, a detection distance necessary for each angle of steering wheel is decided based on an angle of steering wheel and vehicle speed, and the intensity of the laser beam to each angle is controlled. According to one proposal, in the case where the vehicle is detected in front of the own vehicle, the intensity of the laser beam is decreased in the direction of the detected vehicle. According to one proposal, in the case where a short-range obstacle is detected, spread of the laser beam is increased in the direction of the detected obstacle, or an emission cycle is lengthened (for example, see Japanese Unexamined Patent Publication No. 7-167958).

According to one proposal, for example, preliminary emission and main emission are alternately repeated during one scanning period, the main emission is performed with normal intensity higher than that of the preliminary emission in the case where the obstacle is not detected by the preliminary emission with the laser beam of the low intensity, and the main emission is performed with the intensity equal to that of the preliminary emission in the case where the obstacle is detected by the preliminary emission. According to one proposal, the main emission is performed with the normal intensity in the case where the obstacle detected by the preliminary emission is not located near the own vehicle, the main emission is performed with the intensity equal to that of the preliminary emission in the case where the obstacle is located near the own vehicle. A pulse width of the main emission is increased in the case where the obstacle detected by the preliminary emission is not located near the own vehicle, and the pulse width of the main emission is decreased in the case where the obstacle is located near the own vehicle (for example, see Japanese Unexamined Patent Publication No. 2002-181937).

According to one proposal, in a laser radar device in which the light reception signals of the laser beams of plural times are integrated to detect the object while the pulsed laser beam is horizontally scanned, scanning speed of the laser beam is decreased in an area where a reflected light amount is smaller than a predetermined value, and the scanning speed of the laser beam is increased in an area where the reflected light amount is larger than the predetermined value. Therefore, detection accuracy of the low-reflectance object is increased, and time necessary for one-time scanning can be shortened without decreasing the detection accuracy of the high-reflectance object (for example, see Japanese Unexamined Patent Publication No. 2012-63236).

In the case where the laser radar device is used in an urban area, because the vehicle runs at low speed, it is not necessary to monitor a distance. On the other hand, when sensitivity of the laser radar device is excessively increased in order to monitor the distance, because of many stationary bodies such as buildings in the urban area, the object having lower detection necessity is also detected to degrade reliability for a detection result of the laser radar device.

A method for increasing the intensity of the laser beam is conceivable as one of the methods for increasing the sensitivity of the laser radar device. However, the excessively strong laser beam is possibly harmful to a human body. Accordingly, it is impossible to immoderately increase the intensity of the laser beam. There is a problem that the number of components is increased for the change in intensity of the laser beam.

On the other hand, in the case where the vehicle runs at high speed on an expressway or a suburban highway, there is a demand for detecting the farther object, such as the vehicle in front of the own vehicle, in order to avoid collision of contact.

SUMMARY

One or more embodiments of the disclosure are made to properly set the sensitivity for a front-face direction of a vehicle.

According to one or more embodiments of the disclosure, a laser radar device configured to monitor a forward direction of a vehicle includes: a projector configured to project measuring light that is of a pulsed laser beam to the forward direction of the vehicle a plurality of times during a detection period having a first predetermined length; a plurality of light receiving elements configured to receive reflected light of the measuring light from a plurality of detection areas having different directions in a horizontal direction, the plurality of light receiving elements including a light receiving element group configured to receive the reflected light from a detection area group in front of a front face of the vehicle; a measurement section configured to select at least one of light reception signals from the light receiving elements and to measure a light reception value by sampling the selected light reception signal; an integrator configured to integrate the light reception values of the light reception signals from the identical light receiving element at an identical sampling clock time, the light reception values being sampled during the detection period; a detector configured to detect an obstacle in each detection period based on the integrated light reception value; and a sensitivity controller configured to increase the number of times of integrating the light reception values of at least a part of the light receiving element group, when the detector does not detect the obstacle and when speed of the vehicle is greater than or equal to a predetermined threshold based on externally-input information.

In the laser radar device, the measuring light that is of the pulsed laser beam is projected to the forward direction of the vehicle a plurality of times during the detection period having the first predetermined length, the reflected light of the measuring light is received from a plurality of detection areas having different directions in a horizontal direction using the plurality of light receiving elements, the light receiving elements including a light receiving element group configured to receive the reflected light from a detection area group in front of a front face of the vehicle, at least one of light reception signals is selected from the light receiving elements and the light reception value is measured by sampling the selected light reception signal, the light reception values of the light reception signals from the identical light receiving element are integrated at the identical sampling clock time, the light reception values being sampled during the detection period, the obstacle is detected in each detection period based on the integrated light reception value, and the number of times of integrating the light reception values of at least a part of the light receiving element group is increased when the obstacle is not detected and when the speed of the vehicle is greater than or equal to the predetermined threshold based on externally-input information.

Accordingly, the sensitivity for the front-face direction of the vehicle can properly be set.

For example, the projector is constructed with a drive circuit, a light emitting element, a projection optical system and the like. For example, the light receiving element is constructed with a photodiode. For example, the measurement section is constructed with a multiplexer, a TIA, a PGA, an A/D converter and the like. For example, the integrator, the detector, and the sensitivity controller are constructed with a microcomputer and an arithmetic device such as various processors.

In the laser radar device, the sensitivity controller may increase the number of times at which the measurement section selects the light reception signal from at least a part of the light receiving element group during the detection period, when the detector does not detect the obstacle and when the speed of the vehicle is greater than or equal to the predetermined threshold based on the externally-input information.

Therefore, the far object in front of the vehicle can be detected.

In the laser radar device, the projector may repeat processing of projecting the measuring light a plurality of times during a measurement period having a second predetermined length a plurality of cycles during the detection period, the measurement section may select the light reception signal in each measurement period, and the sensitivity controller may increase the number of times at which the measurement section selects the light reception signal from at least a part of the light receiving element group during the detection period, when the detector does not detect the obstacle and when the speed of the vehicle is greater than or equal to the predetermined threshold based on the externally-input information.

Therefore, the far object in front of the vehicle can be detected.

The sensitivity controller can integrate the light reception values of at least a part of the light receiving element group over the plurality of detection periods, when the detector does not detect the obstacle and when the speed of the vehicle is greater than or equal to the predetermined threshold based on the externally-input information.

Therefore, the sensitivity for the front-face direction of the vehicle can be increased without decreasing the sensitivity for directions except the front-face direction of the vehicle.

In the laser radar device, the sensitivity controller may increase a gain amplifying the light reception signal from at least a part of the light receiving element group, when the detector does not detect the obstacle and when the speed of the vehicle is greater than or equal to the predetermined threshold based on the externally-input information.

Therefore, the sensitivity for the front-face direction of the vehicle can further be increased.

In the laser radar device, the sensitivity controller may increase sensitivity for the detection area near the detection area group, when the detector does not detect the obstacle and when the speed of the vehicle is greater than or equal to the predetermined threshold based on the externally-input information.

Therefore, detection accuracy of reflectors of the vehicle in front of the own vehicle can be improved.

According to one or more embodiments of the disclosure, an object detecting method for a laser radar device configured to monitor a forward direction of a vehicle includes the steps of: projecting measuring light that is of a pulsed laser beam to the forward direction of the vehicle a plurality of times during a detection period having a predetermined length; receiving reflected light of the measuring light from a plurality of detection areas having different directions in a horizontal direction using a plurality of light receiving elements, the light receiving elements including a light receiving element group configured to receive the reflected light from a detection area group in front of a front face of the vehicle; selecting at least one of light reception signals from the light receiving elements and measuring a light reception value by sampling the selected light reception signal; integrating the light reception values of the light reception signals from the identical light receiving element at an identical sampling clock time, the light reception values being sampled during the detection period; detecting an obstacle in each detection period based on the integrated light reception value; and increasing the number of times of integrating the light reception values of at least a part of the light receiving element group, when the obstacle is not detected through processing in the detection step and when speed of the vehicle is greater than or equal to a predetermined threshold based on externally-input information.

In the object detecting method, the measuring light that is of the pulsed laser beam is projected to the forward direction of the vehicle a plurality of times during the detection period having the predetermined length, the reflected light of the measuring light is received from a plurality of detection areas having different directions in a horizontal direction using the plurality of light receiving elements, the light receiving elements including a light receiving element group configured to receive the reflected light from a detection area group in front of a front face of the vehicle, at least one of light reception signals is selected from the light receiving elements and the light reception value is measured by sampling the selected light reception signal, the light reception values of the light reception signals from the identical light receiving element are integrated at the identical sampling clock time, the light reception values being sampled during the detection period, the obstacle is detected in each detection period based on the integrated light reception value, and the number of times of integrating the light reception values of at least a part of the light receiving element group is increased when the obstacle is not detected and when the speed of the vehicle is greater than or equal to the predetermined threshold based on externally-input information.

Accordingly, the sensitivity for the front-face direction of the vehicle can properly be set.

For example, the projection step is performed by a drive circuit, a light emitting element, a projection optical system and the like. For example, the light receiving step is performed by a photodiode. For example, the measurement step is performed by a multiplexer, a TIA, a PGA, an A/D converter and the like. For example, the integration step, the detection step, and the sensitivity control step are performed by a microcomputer and an arithmetic device such as various processors.

According to one or more embodiments of the disclosure, a program causes a computer of a laser radar device to perform processing, the laser radar device being configured to monitor a forward direction of a vehicle, the laser radar device including: a projector configured to project measuring light that is of a pulsed laser beam to the forward direction of the vehicle plural times during a detection period having a first predetermined length; a plurality of light receiving elements configured to receive reflected light of the measuring light from a plurality of detection areas having different directions in a horizontal direction, the plurality of light receiving elements including a light receiving element group configured to receive the reflected light from a detection area group in front of a front face of the vehicle; and a measurement section configured to select at least one of light reception signals from the light receiving elements and to measure a light reception value by sampling the selected light reception signal, the processing including the steps of: integrating the light reception values of the light reception signals from the identical light receiving element at an identical sampling clock time, the light reception values being sampled during the detection period; detecting an obstacle in each detection period based on the integrated light reception value; and increasing the number of times of integrating the light reception values of at least a part of the light receiving element group, when the obstacle is not detected through processing in the detection step and when speed of the vehicle is greater than or equal to a predetermined threshold based on externally-input information.

In the computer performing the program, the light reception values of the light reception signals from the identical light receiving element at the identical sampling clock time is integrated, the light reception values being sampled during the detection period, the obstacle is detected during each detection period based on the integrated light reception value, and the number of times of integrating the light reception values of at least a part of the light receiving element group is increased when the obstacle is not detected through processing in the detection step and when speed of the vehicle is greater than or equal to a predetermined threshold based on externally-input information.

Accordingly, the sensitivity for the front-face direction of the vehicle can properly be set.

For example, the projector is constructed with a drive circuit, a light emitting element, a projection optical system and the like. For example, the light receiving element is constructed with a photodiode. For example, the measurement section is constructed with a multiplexer, a TIA, a PGA, an A/D converter and the like.

Accordingly, in one or more embodiments of the disclosure, the sensitivity for the front direction of the vehicle can properly be set.

BRIEF DESCRIPTION OF THE DRAWINGS

FIG. 21 is a view illustrating an example of the combination of the light receiving elements selected in one detection period;

FIG. 30 is a view illustrating an example of the combination of the light receiving elements selected during one detection period in the first modification of FIG. 23;

FIG. 38 is a view illustrating an example of the combination of the light receiving elements selected in one detection period in the second modification of FIG. 31;

FIG. 46 is a view illustrating an example of the combination of the light receiving elements selected during one detection period in the third modification of FIG. 39.

DETAILED DESCRIPTION

Embodiments of the disclosure will be described with reference to the drawings. In embodiments of the disclosure, numerous specific details are set forth in order to provide a more through understanding of the invention. However, it will be apparent to one of ordinary skill in the art that the invention may be practiced without these specific details. In other instances, well-known features have not been described in detail to avoid obscuring the invention. The description is made as follows.

1. Embodiment

2. Modifications

1. Embodiment

{Configuration Example of Laser Radar Device 11}

Figure 1:
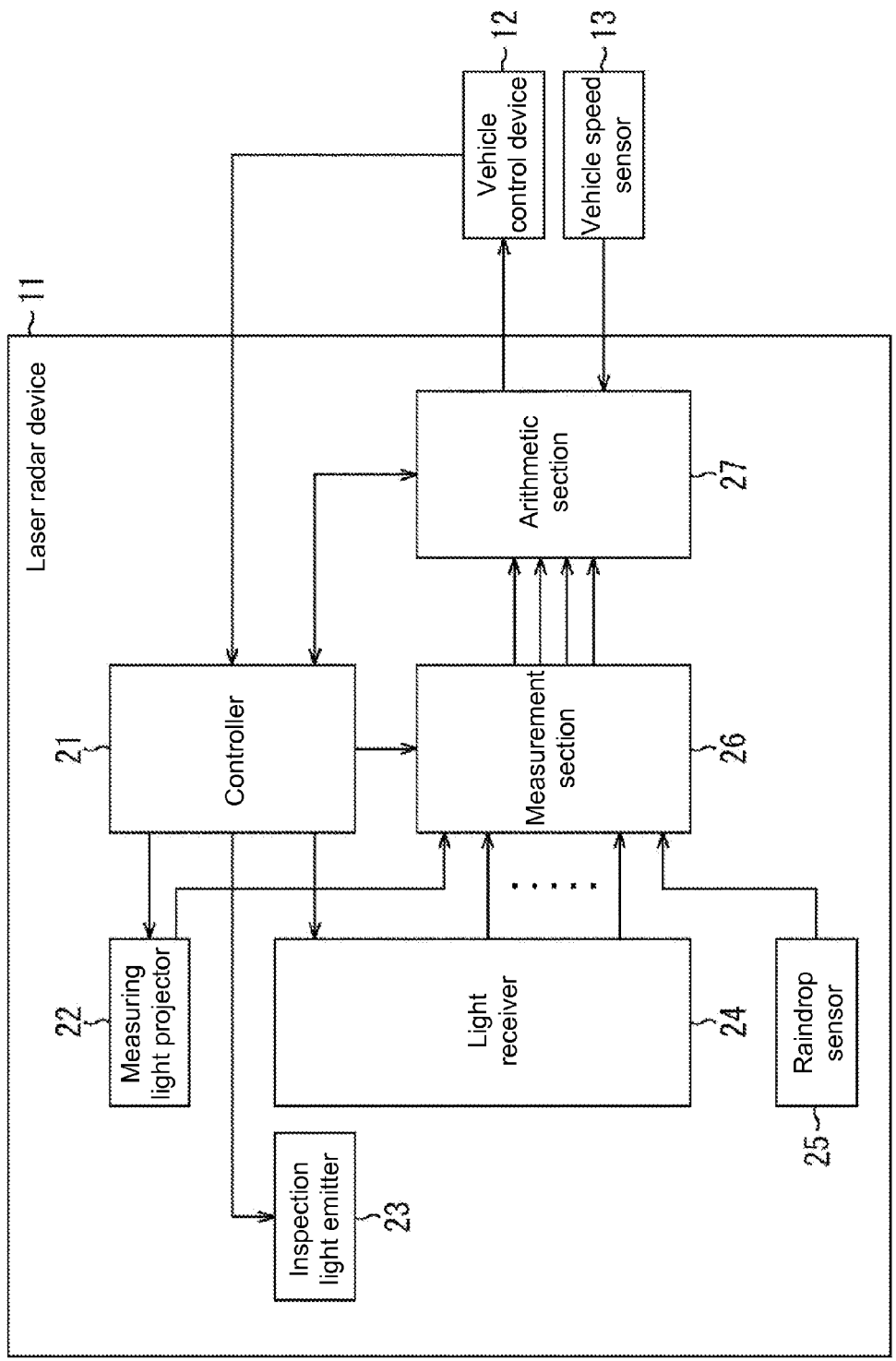
FIG. 1 is a block diagram illustrating a laser radar device according to one or more embodiments of the disclosure.

FIG. 1 illustrates a configuration example of a laser radar device 11 according to one or more embodiments of the disclosure.

For example, the laser radar device 11 is provided in a vehicle to monitor a front of the vehicle. Hereinafter, an area where an object can be detected by the laser radar device 11 is referred to as a monitoring area. Hereinafter, the vehicle provided with the laser radar device 11 is referred to as an own vehicle when distinguished from another vehicle. Hereinafter, a direction parallel to a right-left direction (vehicle width direction) of the own vehicle is referred to as a horizontal direction.

The laser radar device 11 includes a controller 21, a measuring light projector 22, an inspection light emitter 23, a light receiver 24, a raindrop sensor 25, a measurement section 26, and an arithmetic section 27.

The controller 21 controls each section of the laser radar device 11 based on an instruction or information from a vehicle control device 12.

The measuring light projector 22 projects measuring light, which is of a pulsed laser beam (laser pulse) used to detect the object, to a monitoring area. The measuring light projector 22 supplies a reference signal indicating emission timing of the measuring light to the measurement section 26.

The inspection light emitter 23 emits inspection light, which is used to inspect the light receiver 24 and the measurement section 26, to irradiate the light receiver 24.

The light receiver 24 receives reflected light of the measuring light or the inspection light, and detects intensity (brightness) of the reflected light or the inspection light from different directions in the horizontal direction. The light receiver 24 outputs a plurality of light reception signals each of which is an electric signal corresponding to the intensity of the reflected light or inspection light in each direction.

The raindrop sensor 25 detects a raindrop amount adhering to a windshield glass of the own vehicle, and supplies a sensor signal indicating a detection result to the measurement section 26.

Based on the analog light reception signal supplied from the light receiver 24, the measurement section 26 measures the light reception value with respect to the reflected light in the light receiver 24, and supplies the digital light reception signal indicating the measured light reception value to the arithmetic section 27. Based on the analog reference signal supplied from the measuring light projector 22, the measurement section 26 measures the light reception value with respect to the measuring light in the measuring light projector 22, and supplies the digital reference signal indicating the measured light reception value to the arithmetic section 27.

Based on the analog sensor signal supplied from the raindrop sensor 25, the measurement section 26 measures a sensor value, and supplies a digital sensor signal indicating the measured sensor value to the arithmetic section 27.

Based on a measurement result of the light reception value supplied from the measurement section 26, the arithmetic section 27 detects the object in the monitoring area, and supplies the detection result to the controller 21 and the vehicle control device 12. Based on the object detection result and an own vehicle speed supplied from a vehicle speed sensor 13, the arithmetic section 27 controls sensitivity (hereinafter, referred to as detection sensitivity) with which the laser radar device 11 detects the object. Based on the sensor signal supplied from the measurement section 26, the arithmetic section 27 detects existence or non-existence of a rain drop and the raindrop amount on the windshield glass, and supplies the detection result to the controller 21 and the vehicle control device 12.

For example, the vehicle control device 12 is constructed with an ECU (Electronic Control Unit), and performs automatic brake control and a warning to a driver based on the detection result of the object in the monitoring area.

The vehicle speed sensor 13 measures the own vehicle speed, and supplies information indicating the measurement result to the arithmetic section 27.

{Configuration Example of Measuring Light Projector 22}

Figure 2:
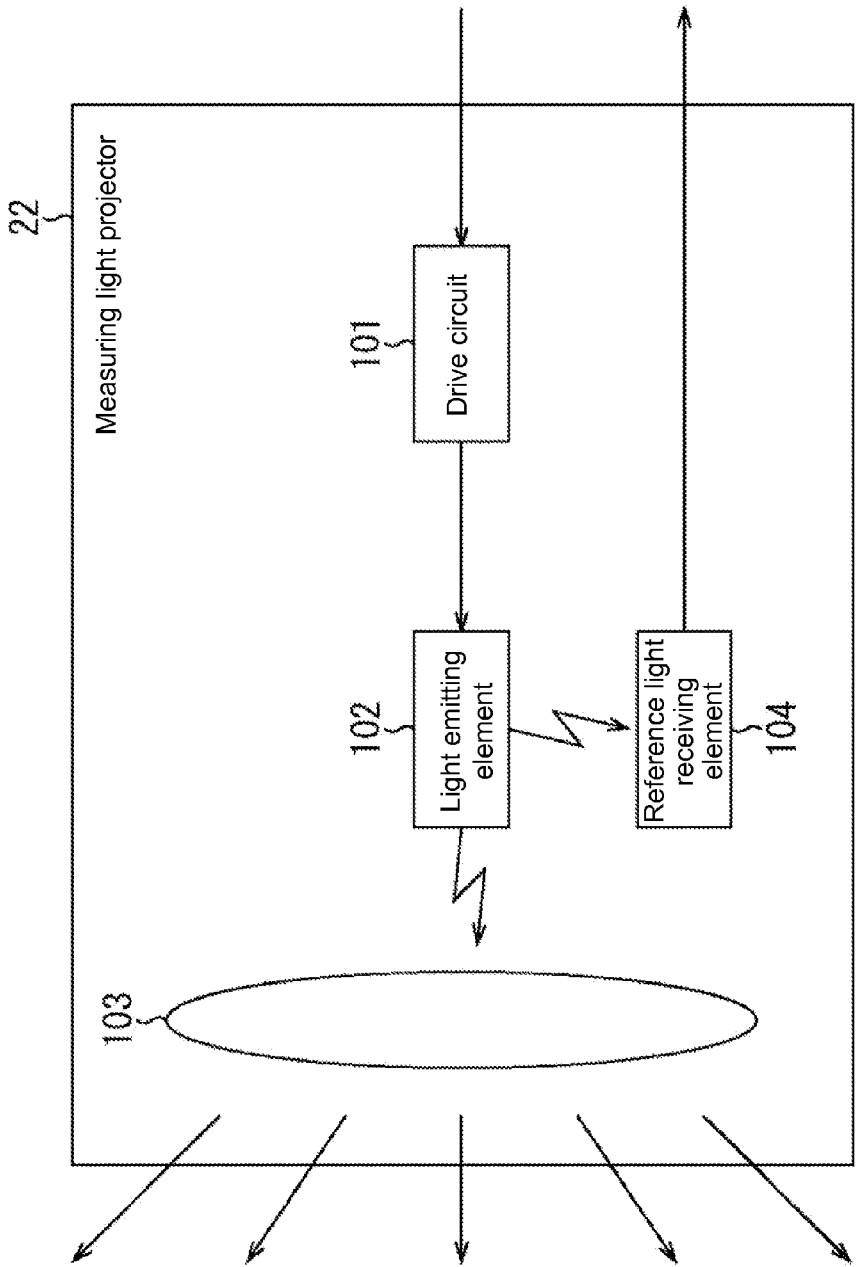
FIG. 2 is a block diagram illustrating a configuration example of a measuring light projector.

FIG. 2 illustrates a configuration example of the measuring light projector 22 of the laser radar device 11. The measuring light projector 22 includes a drive circuit 101, a light emitting element 102, a projection optical system 103, and a reference light receiving element 104.

The drive circuit 101 controls the emission intensity and emission timing of the light emitting element 102 under the control of the controller 21.

For example, the light emitting element 102 is constructed with a laser diode, and emits the measuring light (laser pulse) under the control of the drive circuit 101. The measuring light emitted from the light emitting element 102 is projected to the monitoring area through the projection optical system 103 constructed with a lens and the like.

For example, the reference light receiving element 104 is constructed with a photodiode, receives the measuring light emitted from the light emitting element 102 with no use of the projection optical system 103, and performs photoelectric conversion of the measuring light into the reference signal of a current value corresponding to a light reception amount of the measuring light. The reference light receiving element 104 supplies the obtained reference signal to the measurement section 26.

The reference signal is used to adjust a standard clock time used to measure time until the reflected light is received since measuring light is emitted.

{Configuration Example of Inspection Light Emitter 23 and Light Receiver 24}

Figure 3:
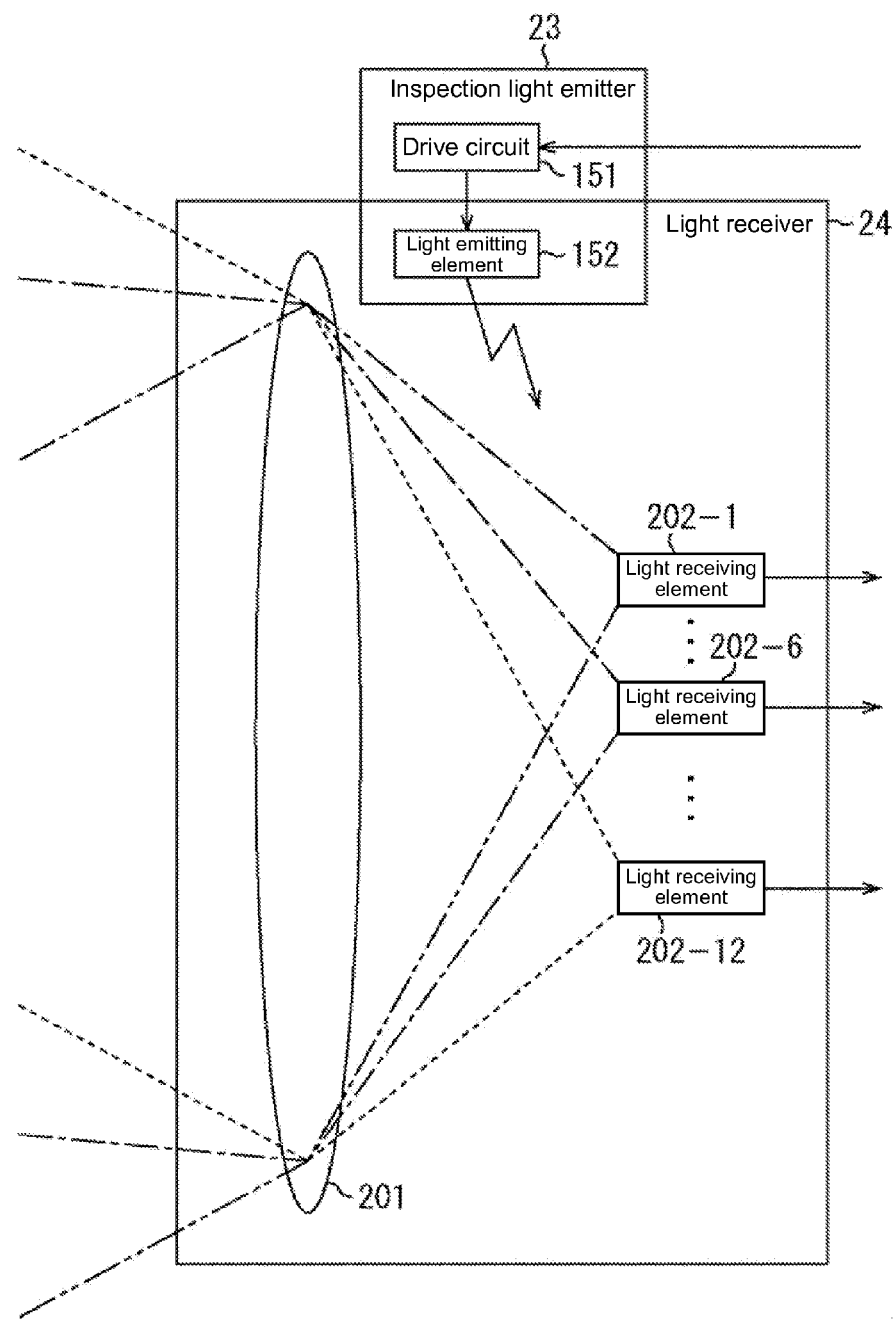
FIG. 3 is a block diagram illustrating a configuration example of an inspection light emitter and a light receiver.

FIG. 3 illustrates a configuration example of the inspection light emitter 23 and light receiver 24 of the laser radar device 11. The inspection light emitter 23 includes a drive circuit 151 and a light emitting element 152.

The light receiver 24 includes a light reception optical system 201 and light receiving elements 202-1 to 202-12.

Hereinafter, the light receiving elements 202-1 to 202-12 are simply referred to as a light receiving element 202 unless individually distinguished from one another.

The drive circuit 151 controls the emission intensity and emission timing of the light emitting element 152 under the control of the controller 21.

For example, the light emitting element 152 is constructed with an LED (Light Emitting Diode), and emits the inspection light of pulsed LED light under the control of the drive circuit 151. A light reception surface of each light receiving element 202 is directly irradiated with the inspection light emitted from the light emitting element 152 with no use of an optical system such as a lens.

The light reception optical system 201 is constructed with a lens and the like, and the light reception optical system 201 is installed such that an optical axis of the light reception optical system 201 is oriented toward a front-back direction of the vehicle. The reflected light of the measuring light reflected by the object in the monitoring area is incident on the light reception optical system 201, and the light reception optical system 201 causes the incident reflected light to be incident on the light receiving element 202.

For example, each light receiving element 202 is constructed with a photodiode that performs the photoelectric conversion of an incident photocharge into the light reception signal of the current value corresponding to a light amount of the photocharge. At a position on which the reflected light incident on the light reception optical system 201 are focused, the light receiving elements 202 are provided so as to form in line perpendicular to the optical axis of the light reception optical system 201 and parallel to the vehicle width direction of the own vehicle (i.e., the horizontal direction).

The reflected light incident on the light reception optical system 201 is incident on each light receiving element 202 while distributed to each light receiving element 202 according to a horizontal angle incident on the light reception optical system 201. Each light receiving element 202 receives the reflected light from different directions in the horizontal direction in the reflected light from the monitoring area. Therefore, the monitoring area is divided into a plurality of areas (hereinafter, referred to as detection areas) in a plurality of directions of the horizontal direction, and each light receiving element 202 individually receives the reflected light from the corresponding detection area. The light receiving element 202 performs the photoelectric conversion of the received reflected light into the light reception signal of the current value corresponding to the light reception amount of the reflected light, and supplies the obtained light reception signal to the measurement section 26.

Figure 4:
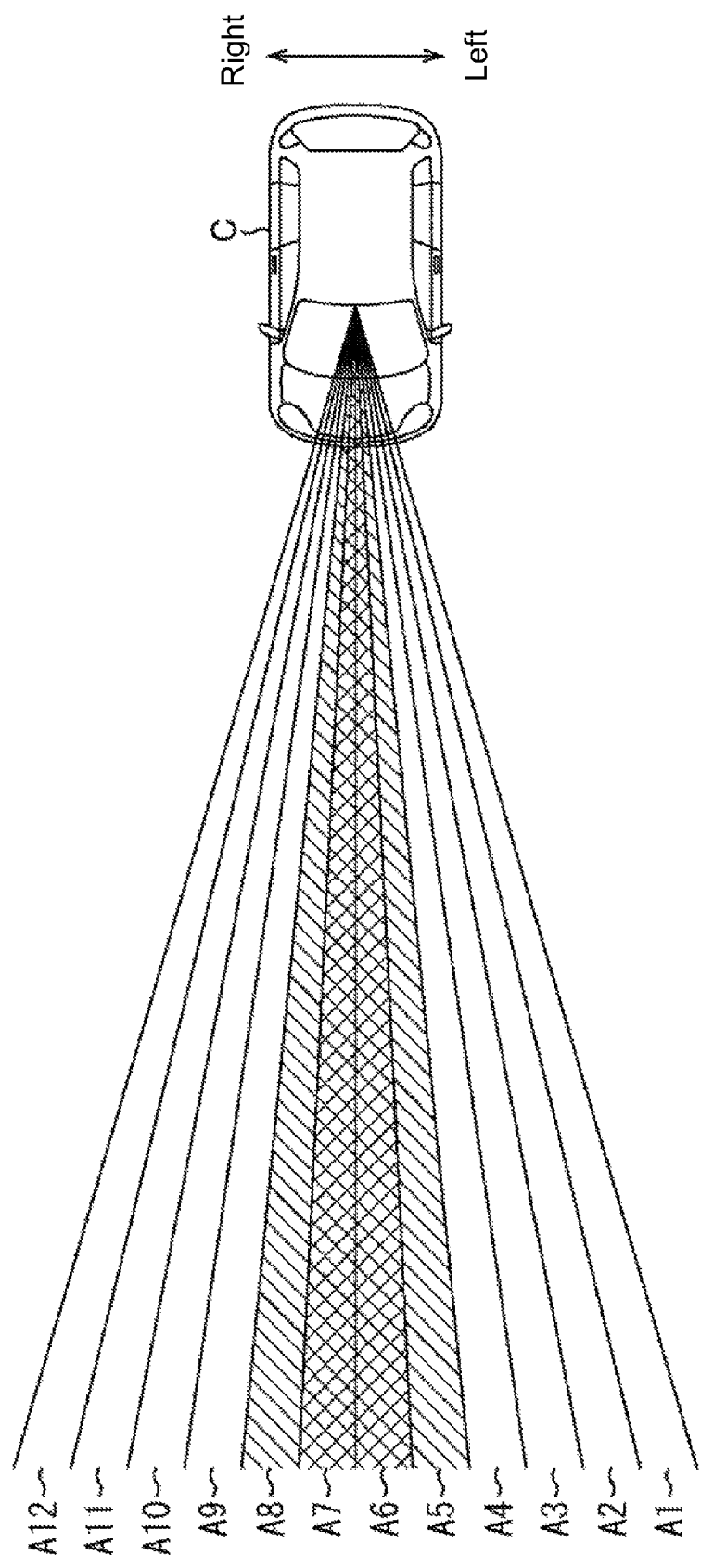
FIG. 4 is a schematic diagram illustrating a position of each detection area.
Figure 5:
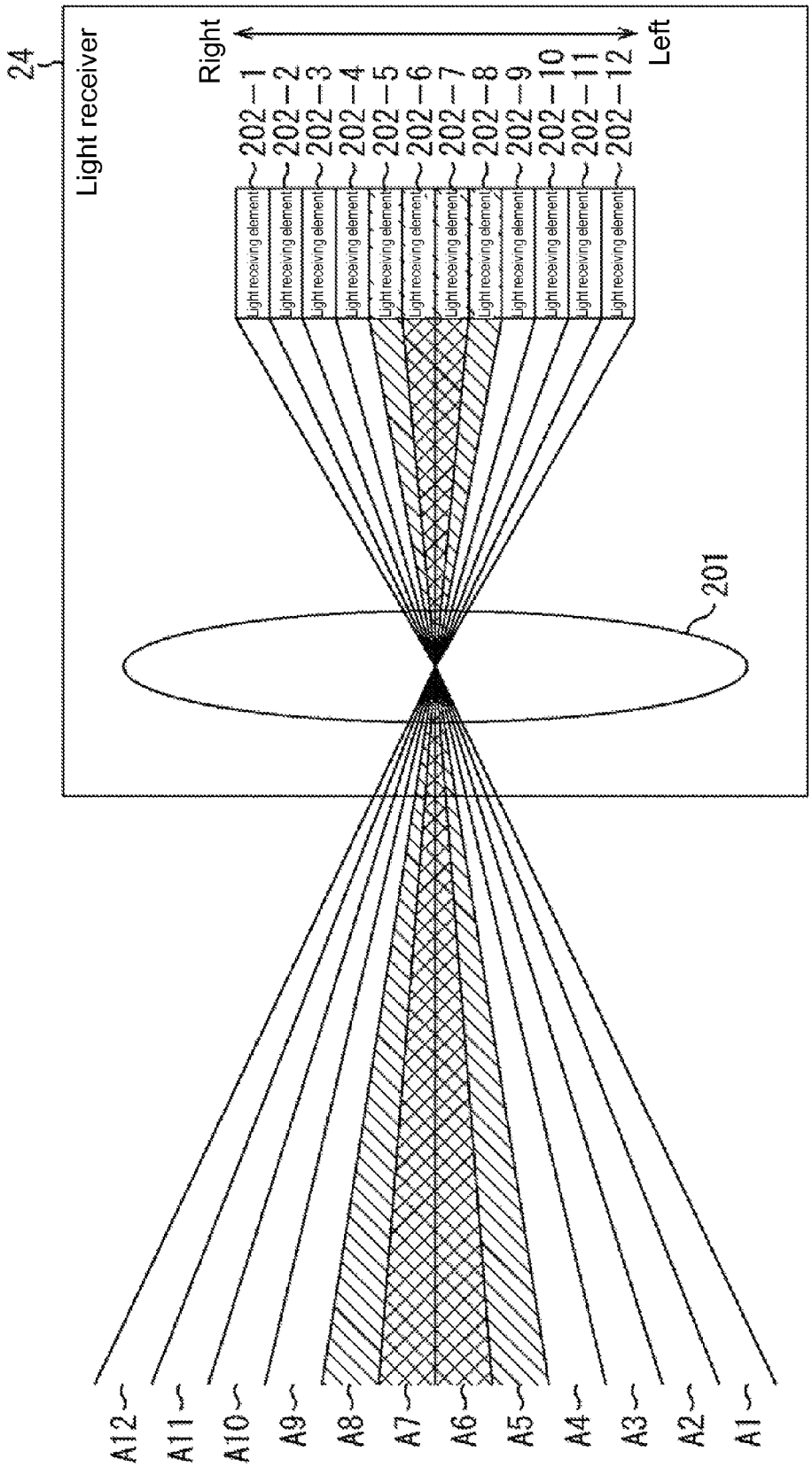
FIG. 5 is a schematic diagram illustrating a relationship between each light receiving element and each detection area.

A specific example of the detection area of each light receiving element 202 will be described with reference to FIGS. 4 and 5. FIG. 4 schematically illustrates a position of each detection area when an own vehicle C provided with the laser radar device 11 is viewed from above. FIG. 5 schematically illustrates a relationship between each light receiving element 202 and each detection area when the light receiver 24 is viewed from above. For the sake of easy understanding, only a light beam passing through the center of a lens of the light reception optical system 201 in the reflected light from each detection area is schematically illustrated in FIG. 5.

The light receiving elements 202 are arrayed in order of the light receiving elements 202-1, 202-2, 202-3, . . . , from the right in a running direction of the own vehicle C. On the other hand, the monitoring area of the laser radar device 11 is constructed with detection areas A1 to A12 that spread radially in front of the own vehicle C, and the detection areas are arrayed in the order of the detection areas A1, A2, A3, . . . from the left in the running direction of the own vehicle C. The light receiving element 202-1 receives the reflected light from the detection area A1 located at a left end of the monitoring area, and the light receiving element 202-12 receives the reflected light from the detection area A1 2 located at a right end of the monitoring area. The light receiving elements 202-5 to 202-8 (hereinafter, also referred to as a front-face light receiving element group) receive the reflected light from the detection areas A5 to A8 (hereinafter, also referred to as a front-face detection area group) expressed by oblique lines or hatching in front of a front face of the own vehicle C, and the light receiving elements 202-6 and 202-7 receive the reflected light from the detection areas A6 and A7 expressed by the hatching in the center of the monitoring area.

Each light receiving element 202 performs the photoelectric conversion of the inspection light from the light emitting element 152 into the light reception signal of the current value corresponding to the light reception amount of the inspection light, and supplies the obtained light reception signal to the measurement section 26.

{Configuration Example of Measurement Section 26}

Figure 6:
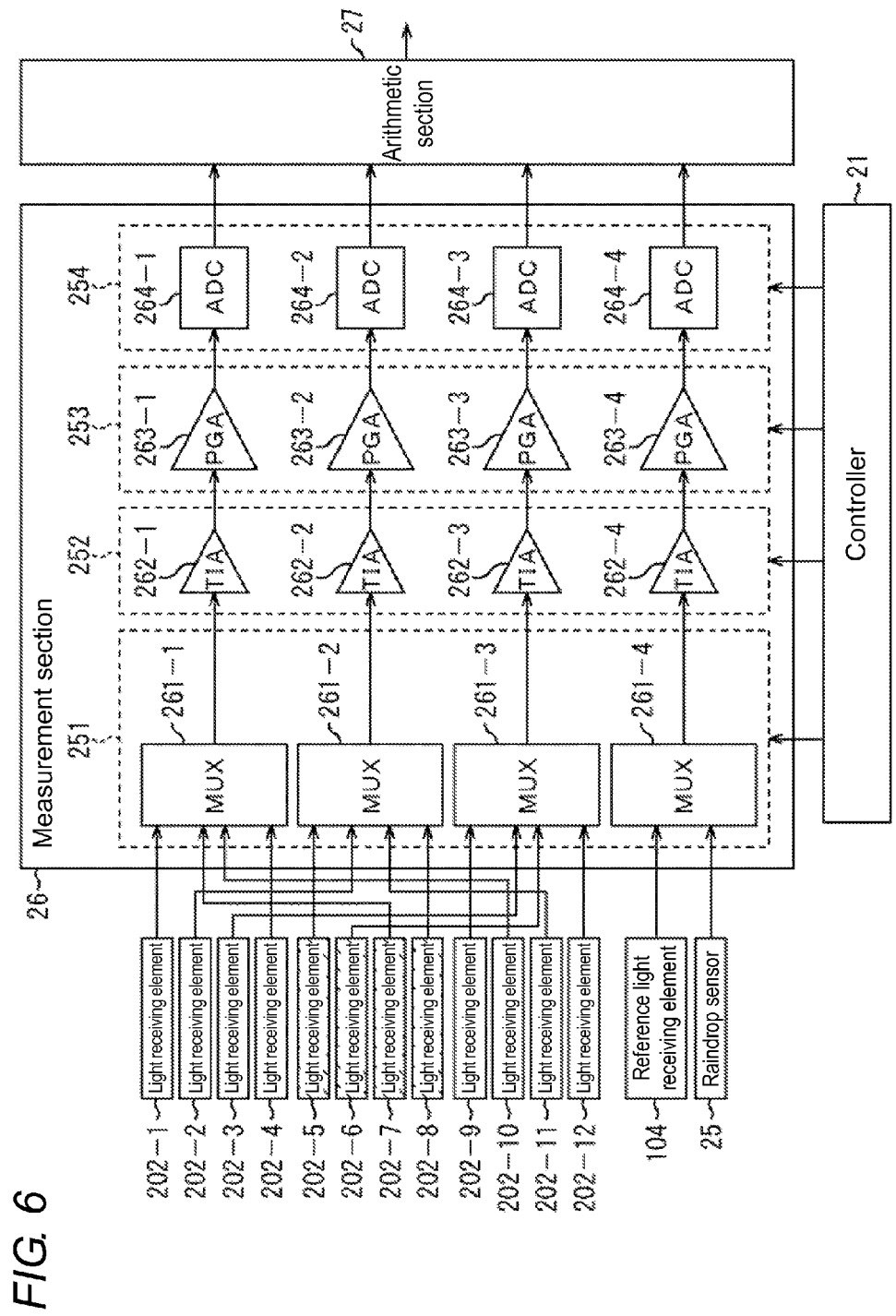
FIG. 6 is a block diagram illustrating a configuration example of a measurement section.

FIG. 6 illustrates a configuration example of the measurement section 26 of the laser radar device 11. The measurement section 26 includes a selector 251, a current-voltage converter 252, an amplifier 253, and a sampling section 254. The selector 251 includes multiplexers (MUXs) 261-1 to 261-4. The current-voltage converter 252 includes Transformer Impedance Amplifiers (TIAs) 262-1 to 262-4. The amplifier 253 includes Programmable Gain Amplifiers (PGAs) 263-1 to 263-4. The sampling section 254 includes AID Converters (ADCs) 264-1 to 264-4.

The light receiving elements 202-1, 202-4, 202-7, and 202-10 are connected to the MUX 261-1, the light receiving elements 202-2, 202-5, 202-8, and 202-11 are connected to the MUX 261-2, and the light receiving elements 202-3, 202-6, 202-9, and 202-12 are connected to the MUX 261-3. The reference light receiving element 104 and the raindrop sensor 25 are connected to the MUX 261-4, The MUX 261-1, the TIA 262-1, the PGA 263-1, and the ADC 264-1 are connected in series, the MUX 261-2, the TIA 262-2, the PGA 263-2, and the ADC 264-2 are connected in series, the MUX 261-3, the TIA 262-3, the PGA 263-3, and the ADC 264-3 are connected in series, and the MUX 261-4, the TIA 262-4, the PGA 263-4, and the ADC 264-4 are connected in series.

As described above, the light receiving elements 202-5 to 202-8 (front-face light receiving element group) expressed by the oblique lines in FIG. 6 are used to monitor the front-face detection area group in front of the front face of the own vehicle. Hereinafter, the MUXs 261-1 to 261-4, the TIAs 262-1 to 262-4, the PGAs 263-1 to 263-4, and the ADCs 264-1 to 264-4 are referred to as an MUX 261, a TIA 262, a PGA 263, and an ADC 264 unless distinguished from one another, respectively.

Under the control of the controller 21, the MUXs 261-1 to 261-3 select at least one of the light reception signals supplied from the four light receiving elements 202, and supply the selected light reception signal to the subsequent TIA 262. In the case where the plurality of light reception signals are selected, the MUXs 261-1 to 261-3 add the selected light reception signals to each other, and supply the added the selected light reception signal to the TIA 262.

Under the control of the controller 21, the MUX 261-4 selects one of the reference signal supplied from the reference light receiving element 104 and the sensor signal supplied from the raindrop sensor 25, and supplies the selected signal to the subsequent TIA 262.

Under the control of the controller 21, each TIA 262 performs current-voltage conversion of the signal supplied from each MUX 261. That is, each TIA 262 amplifies the voltage of the converted signal with a gain set by the controller 21 while converting the signal of the input current into the signal of the voltage. Each TIA 262 supplies the amplified signal to the subsequent PGA 263.

Under the control of the controller 21, each PGA 263 amplifies the voltage of the signal supplied from the TIA 262 with a gain set by the controller 21, and supplies the amplified voltage to the subsequent ADC 264.

Each ADC 264 performs ND conversion of the signal supplied from the preceding PGA 263. That is, under the control of the controller 21, the ADCs 264-1 to 264-3 measure the light reception value by sampling the analog light reception signal supplied from the preceding PGA 263. The ADCs 264-1 to 264-3 supply the digital light reception signal indicating a sampling result (measurement result) of the light reception value to the arithmetic section 27.

Under the control of the controller 21, the ADC 264-4 measures the light reception value or the sensor value by sampling the reference signal or sensor signal supplied from the PGA 263-4. The ADC 264-4 supplies the digital light reception signal or sensor signal indicating a sampling result (measurement result) of the light reception value or sensor value to the arithmetic section 27.

{Configuration Example of MUX 261}

Figure 7:
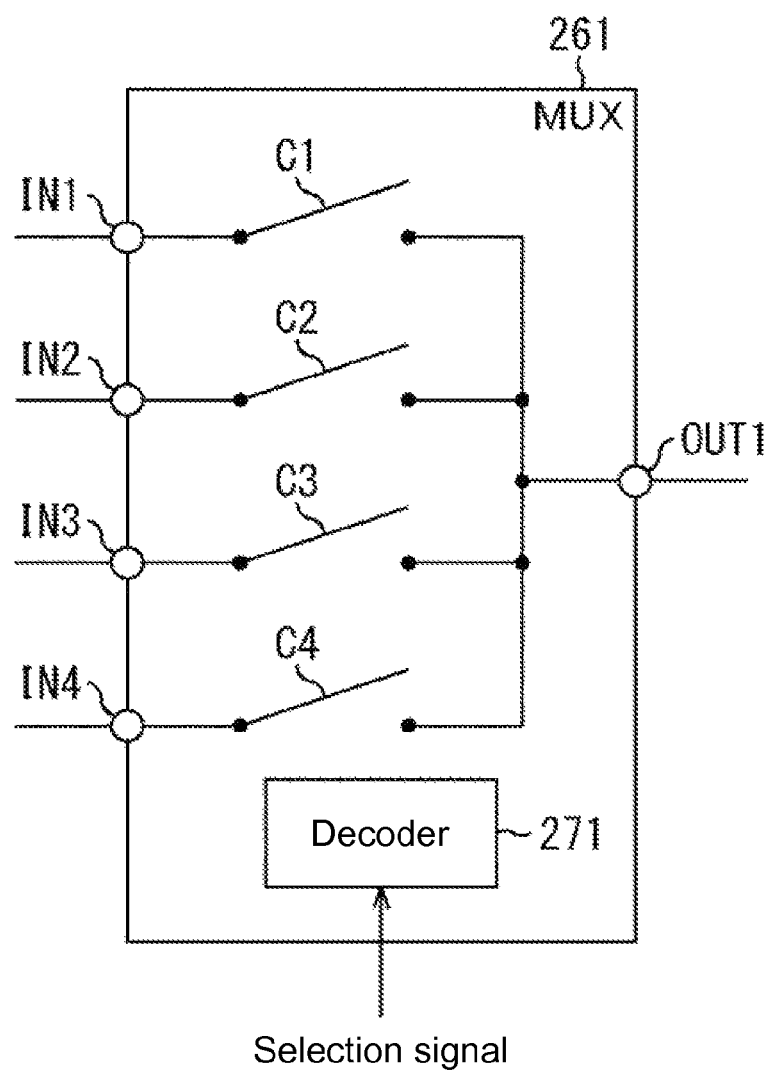
FIG. 7 is a schematic diagram illustrating a configuration example of a function of a multiplexer.

FIG. 7 schematically illustrates a configuration example of the function of the MUX 261.

The MUX 261 includes a decoder 271, input terminals IN1 to IN4, contacts C1 to C4, and an output terminal OUT1. One end of each of the contacts C1 to C4 are connected to each of the input terminals IN1 to IN4, and the other end of each of the contacts C1 to C4 is connected to the output terminal OUT1.

Hereinafter, the input terminals IN1 to IN4 and the contacts C1 to C4 are simply referred to as an input terminal IN and a contact C unless distinguished from one another, respectively.

The decoder 271 decodes a selection signal supplied from the controller 21, and individually switches on and off states of each contact C according to a content of the decoded selection signal. A signal to be input to the input terminal IN connected to the on contact C is selected, and output from the output terminal OUT1. For the plurality of on contacts C, the selected plural signals are added, and output from the output terminal OUT1.

{Configuration Example of Arithmetic Section 27}

Figure 8:
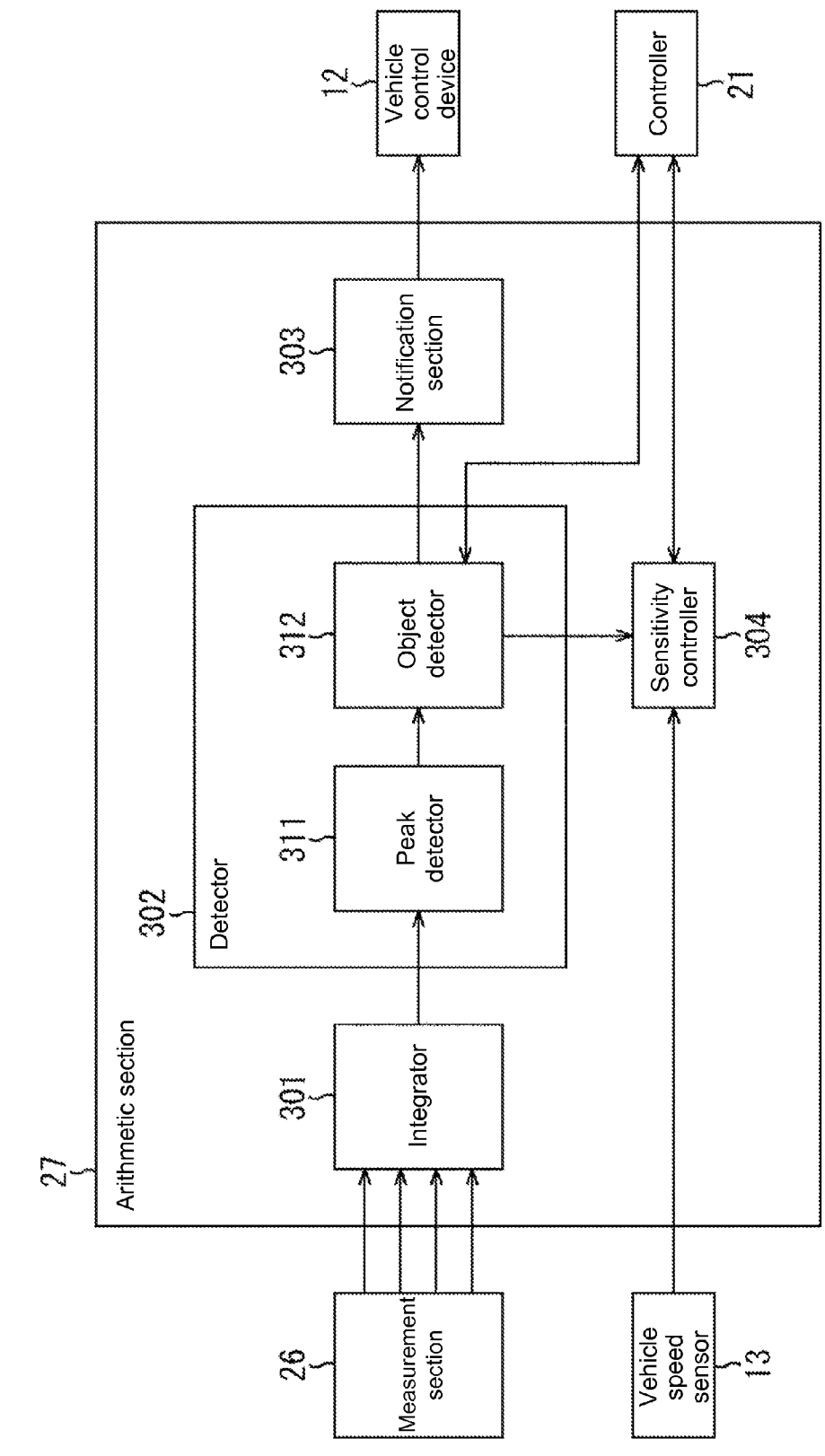
FIG. 8 is a block diagram illustrating a configuration example of a function of an arithmetic section.

FIG. 8 illustrates a configuration example of the arithmetic section 27. At this point, the descriptions about the pieces of processing performed by the arithmetic section 27 with respect to the reference signal from the reference light receiving element 104 and the sensor signal from the raindrop sensor 25 are neglected.

The arithmetic section 27 includes an integrator 301, a detector 302, a notification section 303, and a sensitivity controller 304. The detector 302 includes a peak detector 311 and an object detector 312.

The integrator 301 integrates the light reception values of the identical light receiving elements 202 in each sampling clock time, and supplies an integrated value (hereinafter, referred to as an integrated light reception value) to the peak detector 311.

Based on the integrated light reception value (reflected light intensity) of each light receiving element 202, the peak detector 311 detects peaks in the horizontal direction and time direction (distance direction) of the reflected light intensity of the measuring light, and supplies the detection result to the object detector 312.

Based on the peaks and distributions in the horizontal direction and time direction (distance direction) of the integrated light reception value (reflected light intensity), the object detector 312 detects the object in the monitoring area, and supplies the detection result to the controller 21, the notification section 303, and the sensitivity controller 304.

The notification section 303 supplies the detection result of the object in the monitoring area to the vehicle control device 12.

The sensitivity controller 304 individually controls detection sensitivity of each detection area through the controller 21 based on the object detection result of the object detector 312 and the detection result of the own vehicle speed of the vehicle speed sensor 13.

{Monitoring Processing}

Monitoring processing performed by the laser radar device 11 will be described below with reference to a flowchart in FIG. 9. For example, the monitoring processing is started by turning on an ignition switch or a power switch of the vehicle provided in the laser radar device 11, and the monitoring processing is ended by turning off the ignition switch or the power switch.

In the following description, the processing performed to the reference signal output from the reference light receiving element 104 and the processing performed to the sensor signal output from the raindrop sensor 25 are neglected unless it is necessary.

In Step S1, the sensitivity controller 304 determines whether the obstacle exists. In the case where the object with which the own vehicle possibly collides or contacts is not detected through object detecting processing in Step S4 or S6 described below, the sensitivity controller 304 determines that the obstacle does not exist, and the flow goes to processing in Step S2. A reflective member embedded in a road surface is not determined as the object, because there is no risk that the own vehicle collides or contact with the obstacle. Because the object detecting processing is not performed in the processing in Step S1, the sensitivity controller 304 determines that the obstacle does not exist, and the flow goes to processing in Step S2.

In Step S2, based on the detection result of the vehicle speed sensor 13, the sensitivity controller 304 determines whether a vehicle speed of the own vehicle is greater than or equal to a predetermined speed (for example, 30 km/h or more). When the sensitivity controller 304 determines that the vehicle speed of the own vehicle is less than the predetermined speed, the flow goes to processing in Step S3.

On the other hand, when the sensitivity controller 304 determines that the obstacle exists in Step S1, the processing in Step S2 is skipped, and the flow goes to the processing in Step S3.

In Step S3, the sensitivity controller 304 issues an instruction to the controller 21 to set the detection sensitivity to a normal sensitivity.

In Step S4, the laser radar device 11 performs the object detecting processing. Then the flow goes to processing in Step S7. In the object detecting processing (hereinafter, referred to as normal object detecting processing) of Step S4, all the detection areas are monitored with the normal detection sensitivity to detect the object. Detailed normal object detecting processing will be described below with reference to a flowchart in FIG. 10.

In Step S51, each MUX 261 selects the light receiving element 202. Specifically, under the control of the controller 21, each MUX 261 selects the light reception signal supplied to the subsequent TIA 262 among the light reception signals input to the MUXs 261. The light reception value of the light receiving element 202 that is of an output source of the selected light reception signal is measured in the following processing. In other words, the intensity of the reflected light from the detection area of the selected light receiving element 202 is measured.

At this point, the controller 21 sets gains of the TIA 262 and PGA 263 to standard values. For example, the standard values are set to slightly lower values suitable to detect the short-range object in an urban area. Because the long-range object is not detected, the unnecessary object is prevented from being detected in the urban area. The standard value may be adjusted in each light receiving element 202 according to an individual difference of the light receiving element 202 and a characteristic of each detection area.

In Step S52, the measuring light projector 22 projects the measuring light. Specifically, under the control of the controller 21, the drive circuit 101 causes the light emitting element 102 to emit the pulsed measuring light. The measuring light emitted from the light emitting element 102 is projected to the whole monitoring area through the projection optical system 103.

In Step 853, the light receiver 24 generates the light reception signal according to the reflected light. Specifically, through the light reception optical system 201, each light receiving element 202 receives the reflected light from the detection area in the corresponding direction in the reflected light of the measuring light projected in the processing of Step 852. Each light receiving element 202 performs the photoelectric conversion of the received reflected light into the light reception signal that is of the electric signal corresponding to the light reception amount of the reflected light, and supplies the obtained light reception signal to the subsequent MUX 261.

In Step S54, the measurement section 26 samples the light reception signal. Specifically, under the control of the controller 21, each TIA 262 performs the current-voltage conversion of the light reception signal supplied from each MUX 261, and amplifies the voltage of the light reception signal with the gain set by the controller 21. Each TIA 262 supplies the amplified light reception signal to the subsequent PGA 263.

Under the control of the controller 21, each PGA 263 amplifies the voltage of the light reception signal supplied from the TIA 262 with the gain set by the controller 21, and supplies the amplified voltage to the subsequent ADC 264.

Under the control of the controller 21, each ADC 264 samples the light reception signal supplied from each PGA 263, and performs the ND conversion of the light reception signal. Each ADC 264 supplies the post-ND-conversion light reception signal to the integrator 301.

The light reception signal sampling processing is described in detail later with reference to FIG. 11.

In Step S55, the integrator 301 integrates the present light reception value and the light reception values up to the previous time. As described later with reference to FIG. 12, the light reception values from the identical light receiving element 202 are integrated at the identical sampling clock time. The integrator 301 concurrently performs the light reception value integrating processing to the light reception signals output from the ADCs 264. Therefore, the light reception values of the three light receiving elements 202 are concurrently integrated.

In Step S56, the controller 21 determines whether the light reception value is measured the predetermined number of times (for example, 100 times). When the controller 21 determines that the light reception value is not measured the predetermined number of times, the flow returns to the processing in Step S52.

The pieces of processing in Steps S52 to S56 are repeated until the controller 21 determines that the light reception value is measured the predetermined number of times in Step S56. Therefore, during a measurement period having a predetermined length (to be described), the processing of projecting the measuring light to measure the light reception value of the selected light receiving element 202 is repeated the predetermined number of times. The measured light reception values are integrated.

On the other hand, when the controller 21 determines that the light reception value is measured the predetermined number of times in Step S56, the flow goes to processing in Step S57.

In Step S57, the controller 21 determines whether the measurement period is repeated the predetermined number of times (for example, four times). When the controller 21 determines that the measurement period is not repeated the predetermined number of times, the flow returns to the processing in Step S51.

The pieces of processing in Steps S51 to S57 are repeated until the controller 21 determines that the measurement period is not repeated the predetermined number of times in Step S57. That is, during the measurement period having the predetermined length, the measurement period is repeated the predetermined number of times. During each measurement period, the light receiving element 202 that becomes a measurement target of the light reception value is selected, and the detection area that becomes measurement target of the reflected light intensity is switched.

On the other hand, when the controller 21 determines that the measurement period is repeated the predetermined number of times in Step S57, the flow goes to processing in Step S58.

A specific example of the pieces of processing in Steps S51 to S57 will be described with reference to FIGS. 11 to 13.

Figure 11:
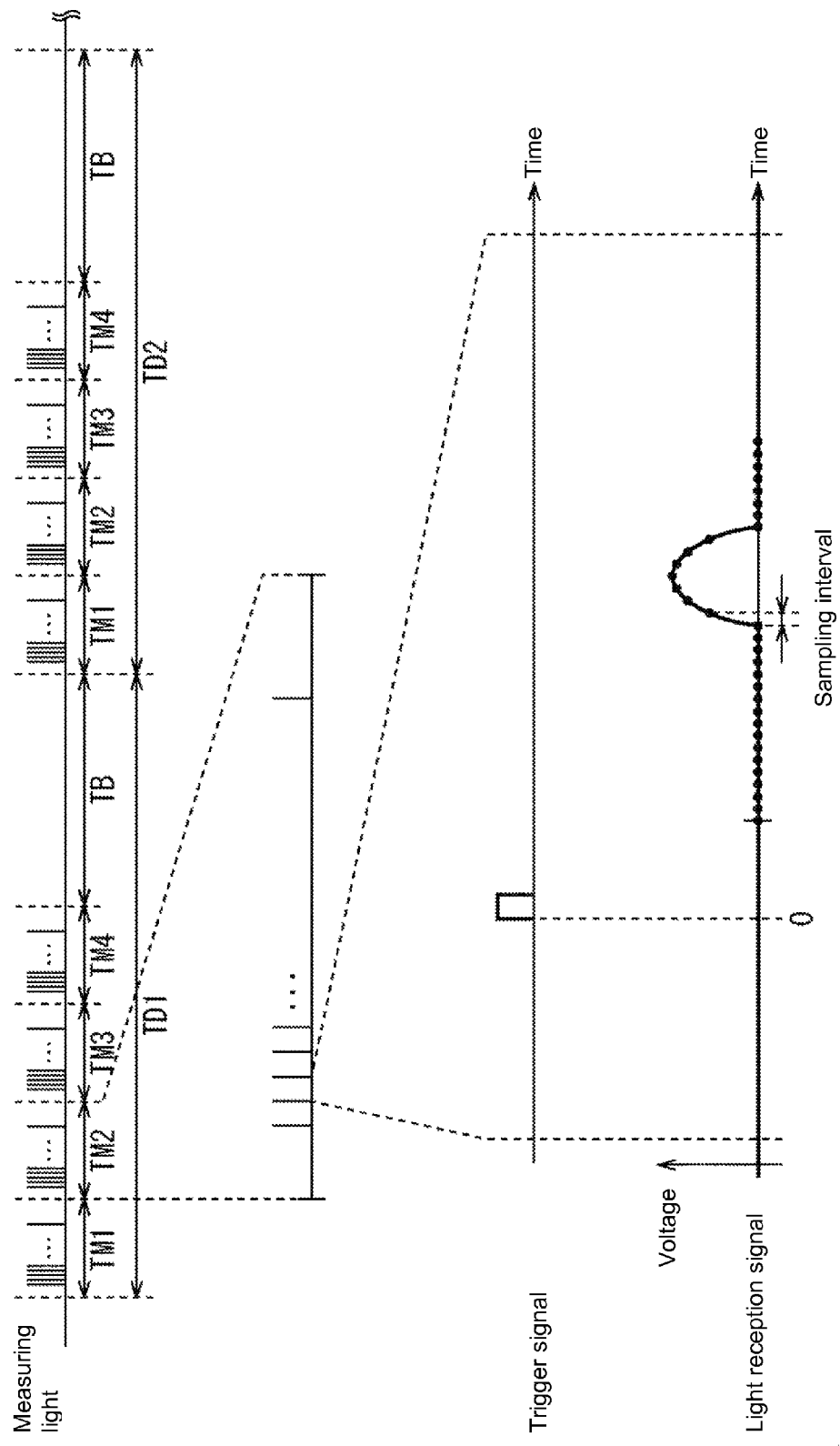
FIG. 11 is a timing chart illustrating the object detecting processing.

FIG. 11 is a timing chart illustrating the specific example of the light reception signal sampling processing. In each stage of FIG. 11, a horizontal axis indicates time.

A top stage of FIG. 11 indicates emission timing of the measuring light. Each of detection periods TD1, TD2, . . . is a minimum unit of a period during which the object detecting processing is performed, and the object detecting processing is performed once during one detection period.

Each detection period includes measurement periods TM1 to TM4 of four cycles and a pausing period TB. The measurement period is a minimum unit in which the light receiving element 202 measuring the light reception value is switched. While the light receiving element 202 can be selected before the measurement period, the light receiving element 202 cannot be changed during the measurement period. Accordingly, during one measurement period, the light reception values of the identical light receiving elements 202 are measured. Therefore, the detection area that becomes the measurement target of the reflected light intensity in units of measurement periods can be switched.

A second stage of FIG. 11 is an enlarged view illustrating the measurement period TM2 of the detection period TD1. As illustrated in the second stage of FIG. 11, the measuring light is projected the predetermined number of times (for example, 100 times) at predetermined intervals during the one-cycle measurement period.

A third stage of FIG. 11 indicates a waveform of a trigger signal defining sampling timing of the ADC 264, and a fourth stage indicates the sampling timing of the light reception signal in the ADC 264. In a fourth stage of FIG. 11, the vertical axis indicates a value (voltage) of the light reception signal, and a plurality of black circles on the light reception signal indicates sampling points. Accordingly, time between the black circles adjacent to each other becomes a sampling interval.

The controller 21 supplies a trigger signal to each ADC 264 after predetermined time elapses since the measuring light is projected. After predetermined time elapses since the trigger signal is input, each ADC 264 samples the light reception signal the predetermined number of times (for example, 32 times) at a predetermined sampling frequency (for example, several tens to several hundreds of megahertz). That is, every time the measuring light is projected, the light reception signal selected by the MUX 261 is sampled the predetermined number of times at predetermined sampling intervals.

For example, assuming that the sampling frequency of the ADC 264 is 100 MHz, the sampling is performed at sampling intervals of 10 nanoseconds. Accordingly, the light reception value is sampled at intervals of about 1.5 m in terms of distance. That is, the reflected light intensity is measured at each point of about 1.5-m interval in the distance direction from the own vehicle in each detection area.

Each ADC 264 supplies the digital light reception signal, which indicates the sampling value (light reception value) at each sampling clock time based on the trigger signal (a clock time the trigger signal is input is set to 0), to the integrator 301.

Thus, the light reception signal of each light receiving element 202 selected by the MUX 261 is sampled every time the measuring light is projected. The light reception signals of the light receiving elements 202 selected by the MUXs 261-1, 261-2, and 261-3 are concurrently sampled by the ADCs 264-1, 264-2, and 264-3. Therefore, the reflected light intensity is measured in units of predetermined distances in the detection area of each selected light receiving element 202.

On the other hand, the projection of the measuring light and the measurement of the light reception value are interrupted during the pausing interval TB. The object detecting processing is performed based on the measurement result of the light reception value during the measurement periods TM1 to TM4, and the measuring light projector 22, the light receiver 24, and the measurement section 26 are set, adjusted, and tested.

A specific example of the light reception value integrating processing will be described below with reference to FIG. 12. FIG. 12 illustrates an example of processing of integrating the 100-time light reception signals output from a certain light receiving element 202 in the case where the measuring light is projected 100 times during the one-cycle measurement period. In FIG. 12, the horizontal axis indicates a clock time (sampling clock time) based on the time the trigger signal is input (the clock time of 0), and the vertical axis indicates the light reception value (sampled value).

Figure 12:
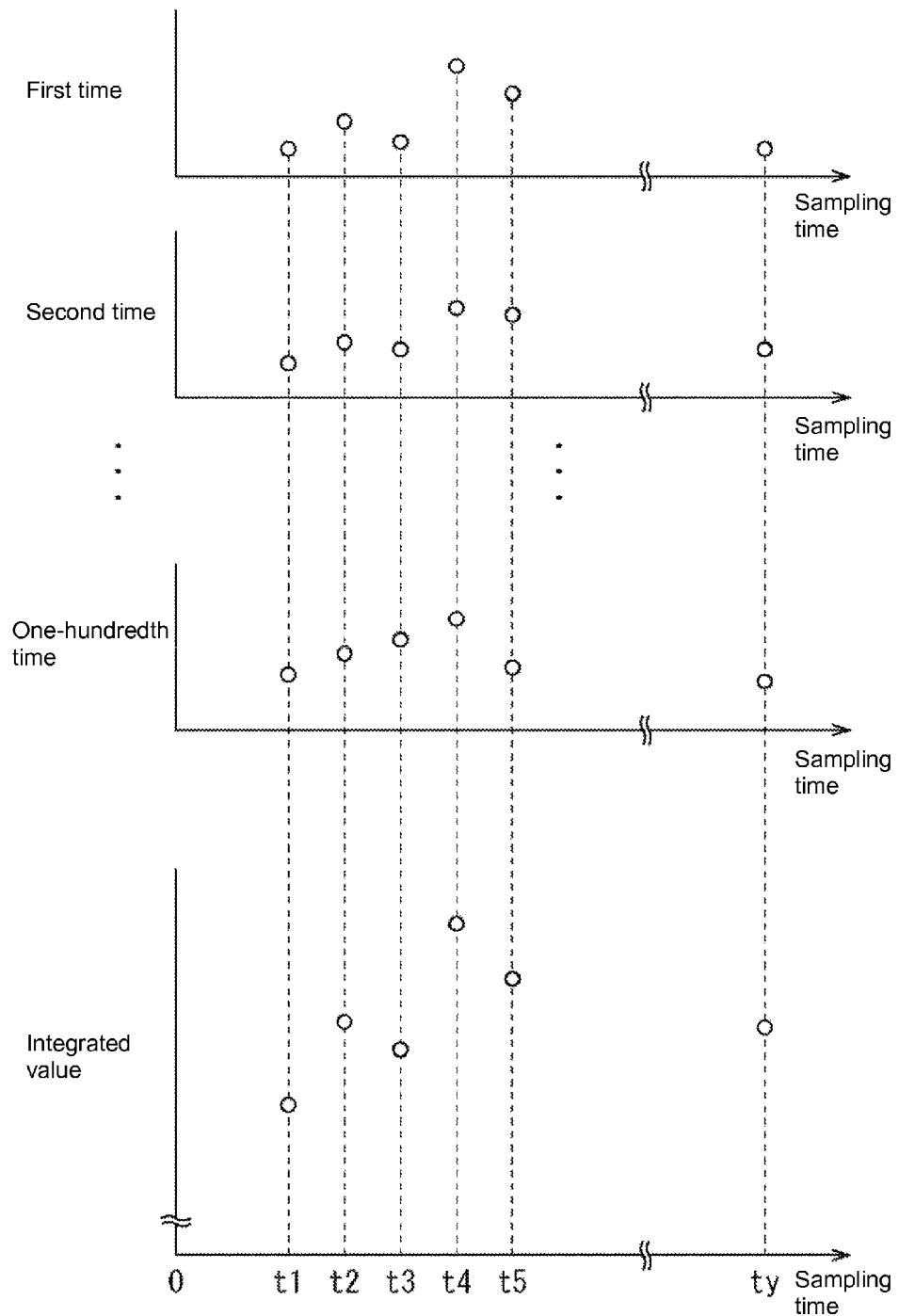
FIG. 12 is a view illustrating processing of integrating light reception values.

As illustrated in FIG. 12, the light reception signal is sampled at sampling clock times t1 to ty with respect to the measuring light from a first time to a hundredth time, and the light reception values are integrated at the identical sampling clock time. For example, the light reception values are integrated at the sampling clock time t1 with respect to the measuring light from the first time to the hundredth time. The light reception values, which are sampled during the detection period and output from the identical light receiving element 202, are integrated at the identical sampling clock time. The integrated value is used in the following processing.

In the case where the MUX 261 adds the light reception signals from the plurality of light receiving elements 202, for example, the light reception values in each of which the light reception signals from the light receiving elements 202-1 and 202-2 are added are integrated independently of the light reception value of the light reception signal only from one of the light receiving element 202-1 and the light receiving element 202-2. In other words, the light reception values in each of which the light reception signals from the light receiving elements 202-1 and 202-2 are added and the light reception value of the light reception signal only from one of the light receiving element 202-1 and the light receiving element 202-2 are distinguished from each other as the light reception value in which a different kind of the light reception signal is sampled, and separately integrated.

Through the integrating processing, a signal component is amplified and a random noise is averaged and decreased, even if an SIN ratio of the light reception signal to the one measuring light is low. As a result, the signal component and the noise component are easily separated from the light reception signal, and the light reception sensitivity can substantially be increased. For example, detection accuracy is improved with respect to the distant object or the low-reflectance object. The light reception sensitivity is increased with increasing number of integration times.

Hereinafter, a set of the measuring processing and the integrating processing performed the predetermined number of times (for example, 100 times) during the one-cycle measurement period is referred to as a measurement and integration unit.

Figure 13:
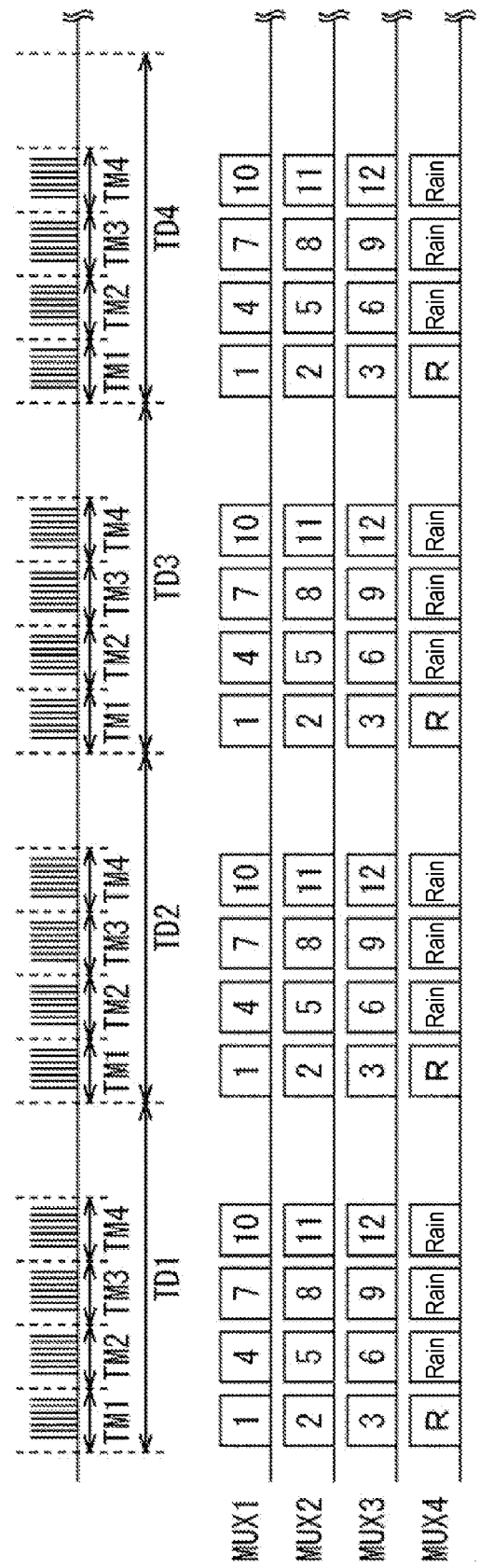
FIG. 13 is a view illustrating an example of a combination of light receiving elements selected in each measurement period during normal object detecting processing.

FIG. 13 illustrates an example of a combination of the light receiving elements 202 selected by each MUX 261 in each measurement period. In FIG. 13, the MUXs 261-1 to 261-4 are abbreviated to MUXs 1 to 4. In FIG. 13, the number in a square box indicates the number of the light receiving element 202 selected by the MUXs 261-1 to 261-4. That is, the light receiving elements 202-1 to 202-12 are indicated by the numbers 1 to 12. "Rain" in the square box indicates the raindrop sensor 25, and "R" indicates the reference light receiving element 104.

For example, during the measurement period TM1, the light receiving elements 202-1 to 202-3 and the reference light receiving element 104 are selected by the MUXs 261-1 to 261-4, the light reception values of the selected light receiving elements 202 and the light reception value of the reference light receiving element 104 are measured. During the measurement period TM2, the light receiving elements 202-4 to 202-6 and the raindrop sensor 25 are selected by the MUXs 261-4 to 261-4, the light reception values of the selected light receiving elements 202 and the sensor value of the raindrop sensor 25 are measured. During the measurement period TM3, the light receiving elements 202-7 to 202-9 and the raindrop sensor 25 are selected by the MUXs 261-1 to 261-4, the light reception values of the selected light receiving elements 202 and the sensor value of the raindrop sensor 25 are measured. During the measurement period TM4, the light receiving elements 202-10 to 202-12 and the raindrop sensor 25 are selected by the MUXs 261-1 to 261-4, the light reception values of the selected light receiving elements 202 and the sensor value of the raindrop sensor 25 are measured.

In the example of FIG. 13, the light reception values of all the light receiving elements 202 are measured during one detection period. In other words, the reflected light intensity is measured from all the detection areas of the monitoring area during one detection period.

Figure 10:
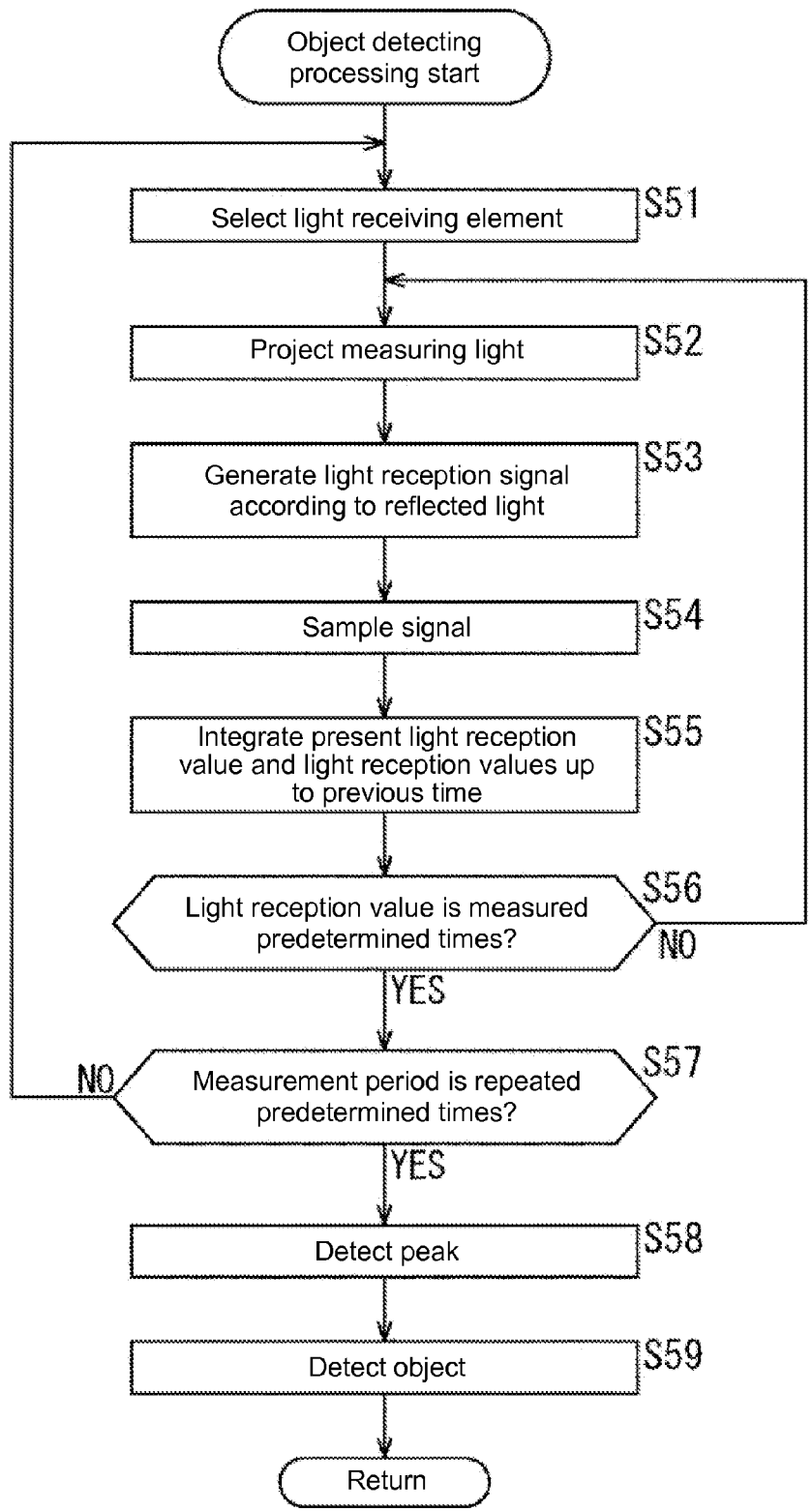
FIG. 10 is a flowchart illustrating object detecting processing.

Referring to FIG. 10, the peak detector 311 detects the peak in Step S58.

Specifically, the integrator 301 supplies the integrated light reception value of each light receiving element 202 during one detection period to the peak detector 311. Based on the distribution of the integrated light reception value of each light receiving element 202 at each sampling clock time, the peak detector 311 detects peaks in the horizontal direction and time direction (distance direction) of the reflected light intensity during the detection period.

Specifically, the peak detector 311 detects the sampling clock time the integrated light reception value is maximized in each light receiving element 202. Therefore, the point of the peak reflected light intensity in the distance direction from the own vehicle is detected in each detection area. In other words, the distance from the own vehicle to the point of the peak reflected light intensity is detected in each detection area.

The peak detector 311 detects the light receiving element 202 (detection area) in which the integrated light reception value is maximized in each sampling clock time. Therefore, in the distance direction from the own vehicle, the horizontal position (detection area) where the reflected light intensity is maximized at predetermined intervals (for example, every about 1.5 m) is detected.

The peak detector 311 supplies information indicating a detection result to the object detector 312.

Any method can be adopted as the method for detecting the peak of the peak detector 311.

In Step S59, the object detector 312 detects the object. Specifically, based on the horizontal direction and time direction of the reflected light intensity during the detection period and the peak detection result, the object detector 312 detects the existence or non-existence of the object such as another vehicle, a pedestrian, and an obstacle in the monitoring area and the kind, direction, and the distance of the object.

Any method can be adopted as the object detecting method of the object detector 312.

An example of the object detecting method will be described with reference to FIG. 14.

Figure 14:
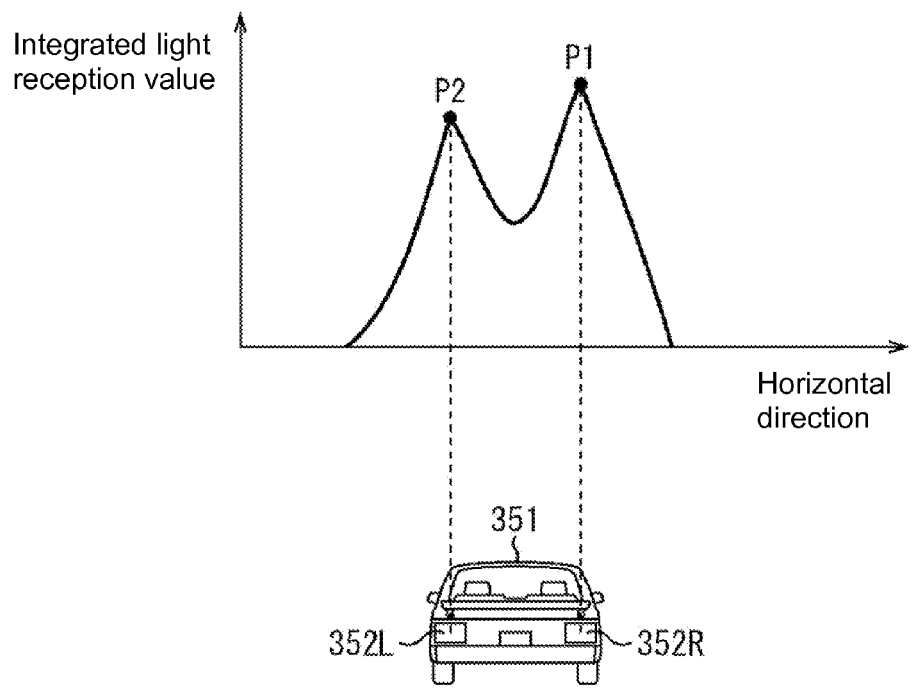
FIG. 14 is a view illustrating an example of a vehicle detecting method.

In a graph of FIG. 14, the horizontal distribution of the integrated light reception value around the sampling clock time the reflected light returns from a vehicle 351 is illustrated in the case where the vehicle 351 runs in front of the own vehicle. In the graph of FIG. 14, the integrated light reception values of the light receiving elements 202 at the sampling clock time are arrayed in the horizontal axis direction in the order of the horizontal arrangement of the light receiving elements 202.

The measuring light is reflected from the vehicle 351, and received by the light receiving element 202, and a time difference is generated between the light projection and the light reception. Because the time difference is proportional to the distance between the laser radar device 11 and the vehicle 351, the reflected light from the vehicle 351 is measured as the light reception value at the sampling time (sampling clock time tn) that agrees with the time difference. Accordingly, the integrated light reception value is particularly increased at the sampling clock time tn among the integrated light reception values of the light receiving elements 202 having the detection area including the vehicle 351.

In the case where the vehicle 351 exists in front of the own vehicle, the integrated light reception values of the light receiving elements 202 having the detection area including the vehicle 351 are increased because the reflected light reflected from the vehicle 351 is received from the light receiving element 202. Because the reflectance is increased in right and left reflectors 352R and 352L at the back of the vehicle 351, the integrated light reception values of the light receiving element 202 having the detection area including the reflectors 352L and 352R are particularly increased.

Accordingly, as illustrated in the graph of FIG. 14, two noticeable peaks P1 and P2 emerge in the horizontal distribution of the integrated light reception value. Because the light reflected from a vehicle body between the reflectors 352L and 352R is detected, the integrated light reception value between the peaks P1 and P2 is also higher than other areas. Thus, in the horizontal distribution of the integrated light reception value at the identical sampling clock time, the vehicle running in front of the own vehicle can be detected by detecting the two noticeable peaks.

When detecting the object, the object detector 312 determines whether the detected object is the obstacle based on the kind and position of the detected object, the speed of the detected object relative to the own vehicle, and the moving direction of the detected object. That is, the object detector 312 determines whether the detected object has a risk of colliding or contacting with the own vehicle.

Then the normal object detecting processing is ended.

Figure 9:
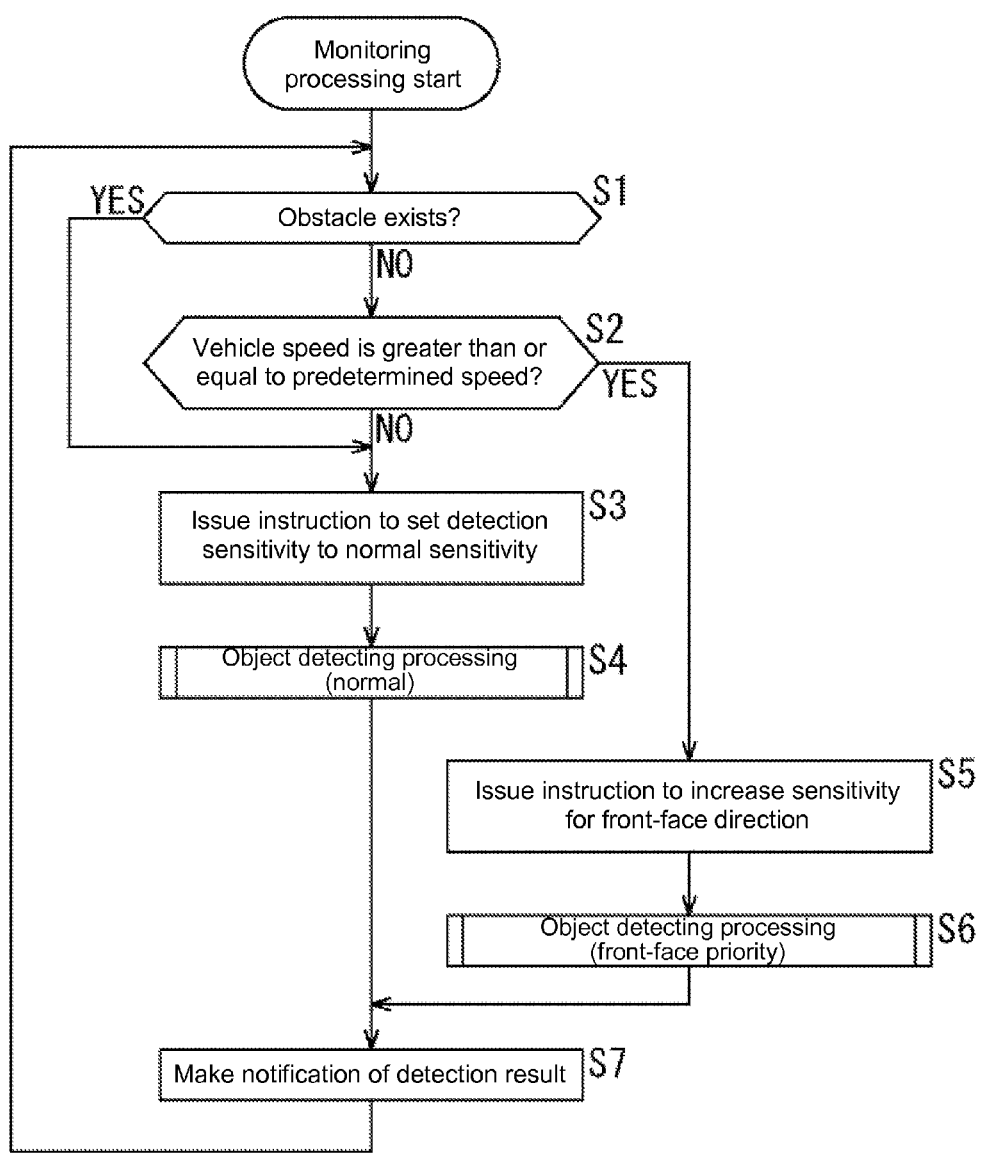
FIG. 9 is a flowchart illustrating monitoring processing.

With reference to FIG. 9, when the sensitivity controller 304 determines that the vehicle speed of the own vehicle is greater than or equal to the predetermined speed in Step S2, the flow goes to the processing in Step S5.

In Step S5, the sensitivity controller 304 issues an instruction to increase the sensitivity for the front-face direction. That is, the sensitivity controller 304 issues the instruction to the controller 21 to increase the sensitivity for the front-face detection area group.

In Step S6, the object detecting processing is performed similarly to the processing in Step S4. Then the flow goes to the processing in Step S7. At this point, in the object detecting processing (hereinafter, referred to as front-face priority object detecting processing), unlike the normal object detecting processing in Step S4, the front-face direction in the monitoring area is preferentially monitored with high sensitivity to detect the object.

The front-face priority object detecting processing differs from the normal object detecting processing in a combination of the light receiving elements 202 selected in each measurement period of one detection period and the setting values of the gains of the TIA 262 and PGA 263.

Figure 21:
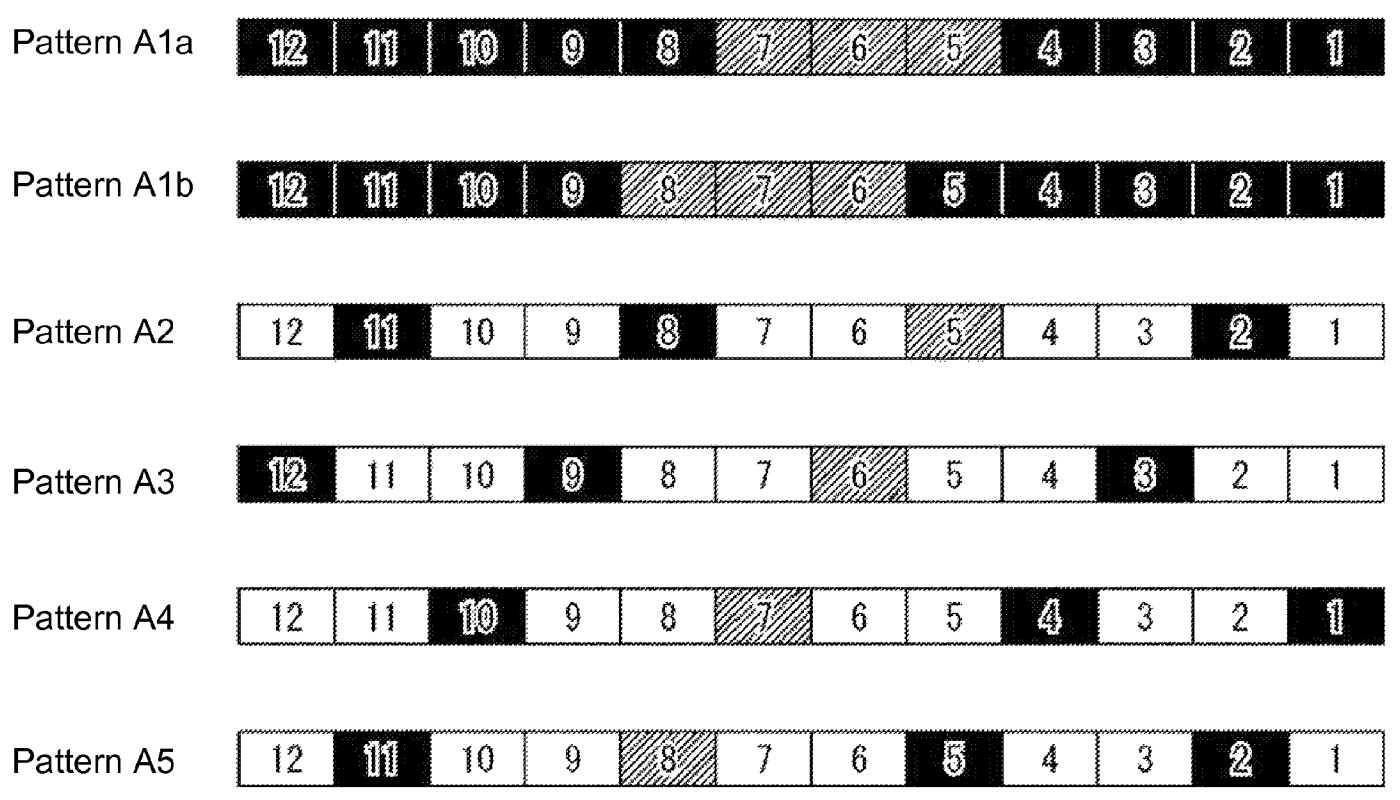

Patterns A1a to A5 in FIGS. 15 to 20 illustrate examples of the combination of the light receiving elements 202 selected in each measurement period. FIG. 21 illustrates the combination of the light receiving elements 202 selected during one detection period in the patterns A1a to A5 of FIGS. 15 to 20. In FIG. 21, the number in the square box indicates the number of each light receiving element 202, and indicates the arrangement of the light receiving elements 202 horizontally arranged in the own vehicle. In FIG. 21, the box of the light receiving element 202 selected plural times during one detection period is indicated by an oblique-line box, the box of the light receiving element 202 selected only once is indicated by an outline box, and the box of the light receiving element 202 that is not selected only once is indicated by a blackened box.

Figure 15:
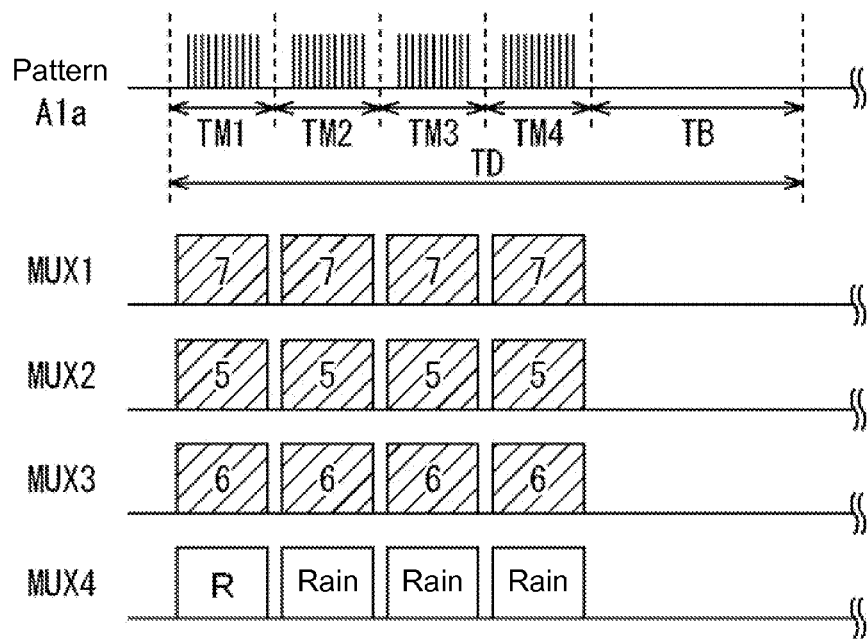
FIG. 15 is a view illustrating a first example of the combination of the light receiving elements selected in each measurement period during front-face priority object detecting processing.

The pattern A1a in FIG. 15 differs from that of the normal object detecting processing of FIG. 13 in that the MUXs 261-1 to 261-3 select only the light receiving elements 202-7, 202-5, and 202-6 over the measurement periods TM1 to TM4. That is, a frequency of selecting the light receiving elements 202-5 to 202-7 in the front-face direction is increased during one detection period. The light reception values of the light receiving elements 202-5 to 202-7 are integrated over the measurement periods TM1 to TM4 of the four cycles, and the integration time is increased four times, whereby the integrated light reception values of the light receiving elements 202-5 to 202-7 become about four times the case of the normal object detecting processing. As a result, compared with the case of the normal object detecting processing, detection sensitivity is improved for the detection areas A5 to A7.

Figure 16:
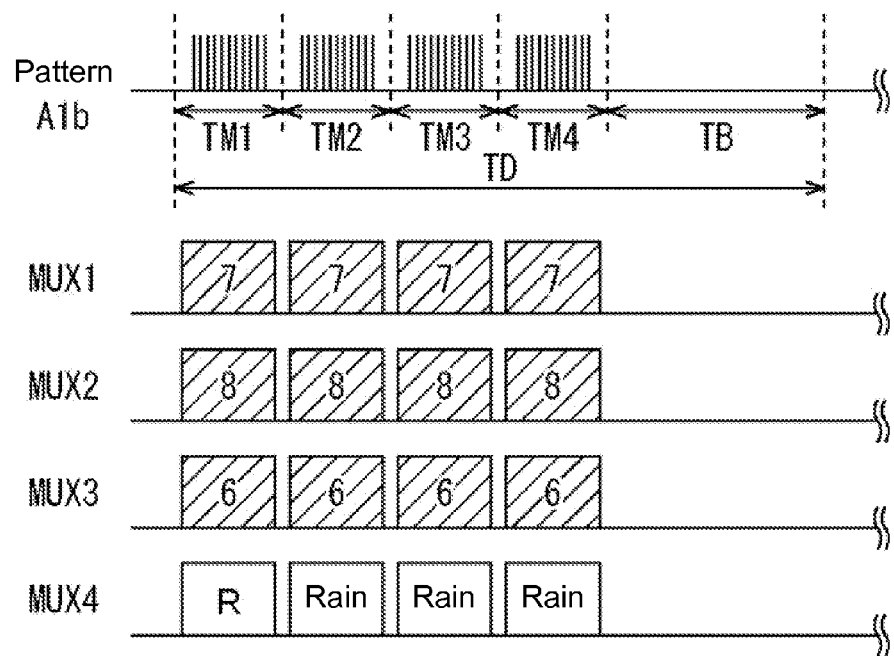
FIG. 16 is a view illustrating a second example of the combination of the light receiving elements selected in each measurement period during the front-face priority object detecting processing.
Figure 17:
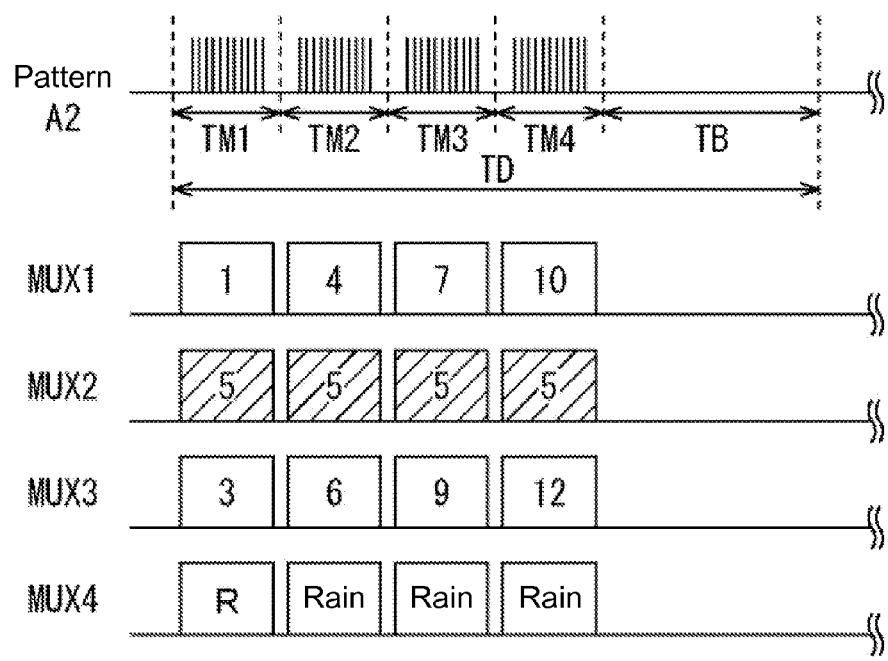
FIG. 17 is a view illustrating a third example of the combination of the light receiving elements selected in each measurement period during the front-face priority object detecting processing.
Figure 18:
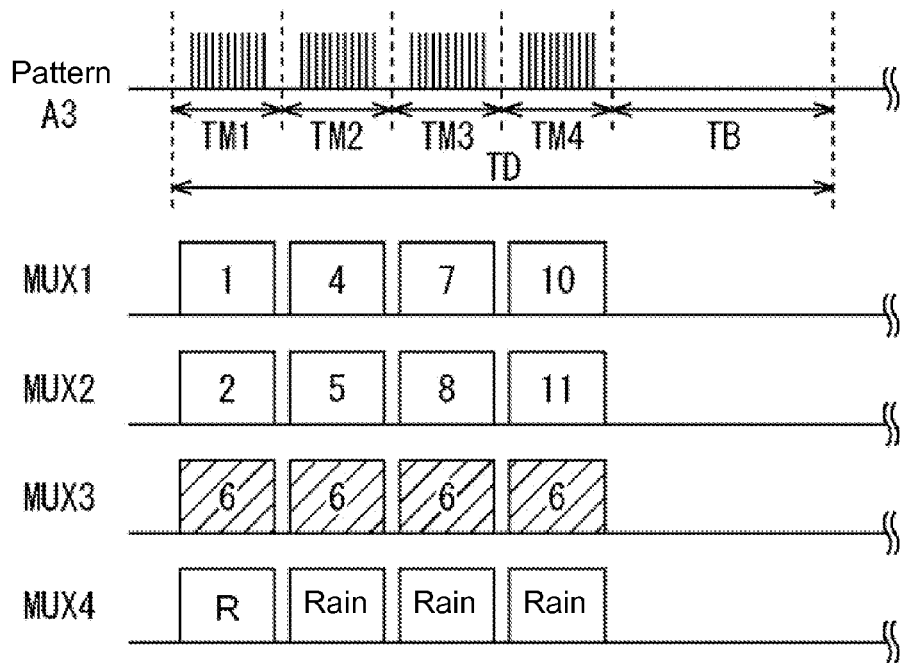
FIG. 18 is a view illustrating a fourth example of the combination of the light receiving elements selected in each measurement period during the front-face priority object detecting processing.
Figure 19:
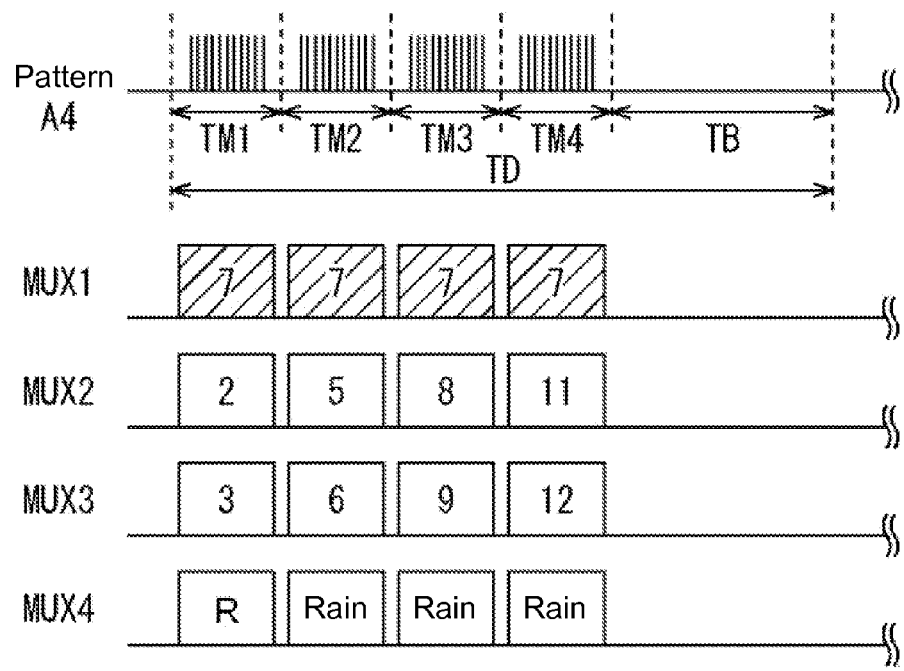
FIG. 19 is a view illustrating a fifth example of the combination of the light receiving elements selected in each measurement period during the front-face priority object detecting processing.
Figure 20:
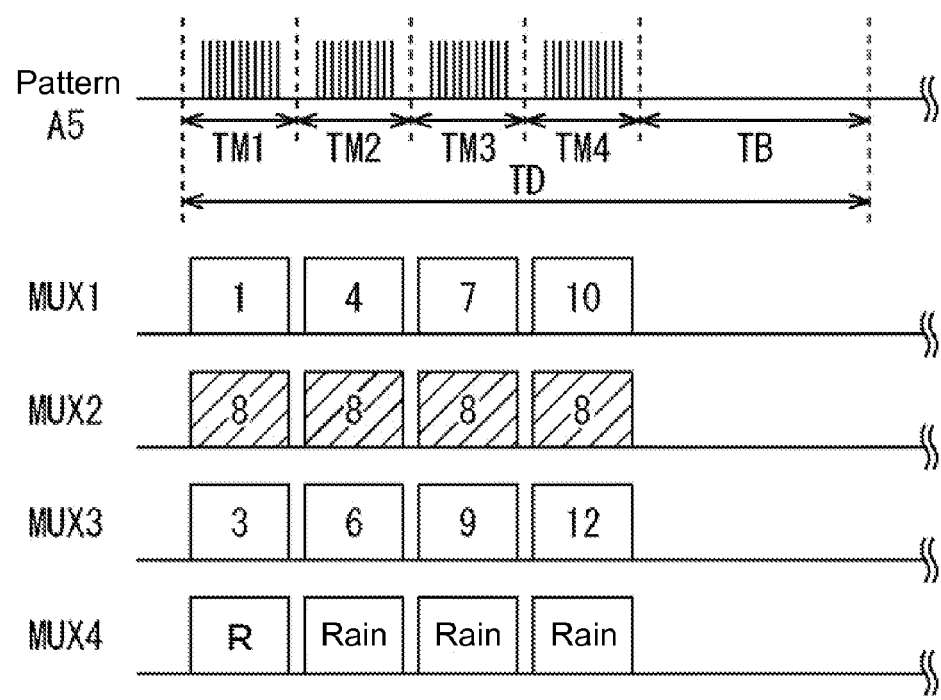
FIG. 20 is a view illustrating a sixth example of the combination of the light receiving elements selected in each measurement period during the front-face priority object detecting processing.

The pattern A1b in FIG. 16 differs from that of the normal object detecting processing of FIG. 13 in that the MUXs 261-1 to 261-3 select only the light receiving elements 202-7, 202-8, and 202-6 over the measurement periods TM1 to TM4. Therefore, the integrated light reception values of the light receiving elements 202-6 to 202-8 become about four times the case of the normal object detecting processing.

The patterns A2 to A5 in FIGS. 17 to 20 differ from the pattern of the normal object detecting processing of FIG. 13 in that one of the light receiving elements 202-5 to 202-8 (front-face light receiving element group) is selected over the measurement periods TM1 to TM4. Therefore, the integrated light reception value of one of the light receiving elements 202-5 to 202-8 becomes about four times the case of the normal object detecting processing.

In the measurement periods TM1 to TM4, the controller 21 sets the gains of the TIA 262 and PGA 263 corresponding to the light receiving elements 202-5 to 202-8 to values higher than the standard values (for example, a maximum value). The gains of the TIA 262 and PGA 263 are set to the values higher than the standard values in the case where one of the light receiving elements 202-5 to 202-8 supplies the light reception signal.

When the own vehicle runs at high speed while the obstacle does not exist, the front-face direction of the own vehicle is intensively monitored with high sensitivity.

Specifically, as illustrated in FIG. 21, in the pattern A1$a$ or A1$b$, only the front-face direction of the own vehicle is intensively monitored with high sensitivity. Accordingly, in the front-face direction of the own vehicle, the farther object can quickly and securely be detected, and the own vehicle can be prevented from colliding or contacting with the vehicle or pedestrian in front of the own vehicle in high-speed running.

In the patterns A2 to A5, part of the front-face direction of the own vehicle is intensively monitored with high sensitivity, and directions except the front-face direction are also continuously monitored. Accordingly, although the patterns A2 to A5 are slightly inferior to the patterns A1$a$ and A1$b$, the farther object can quickly and securely be detected in the front-face direction of the own vehicle. The object can also securely be detected in directions except the front-face direction. Therefore, the collision and contact with the vehicle or pedestrian can be prevented over a wide range centering around part in the front-face direction of the own vehicle.

In addition to the increase in frequency of selecting the front-face light receiving element group during one detection period, for example, the light reception values (the light reception values with respect to the front-face detection area group) of the front-face light receiving elements may be integrated during a plurality of detection periods to increase the detection sensitivity for the front-face direction.

Figure 22:
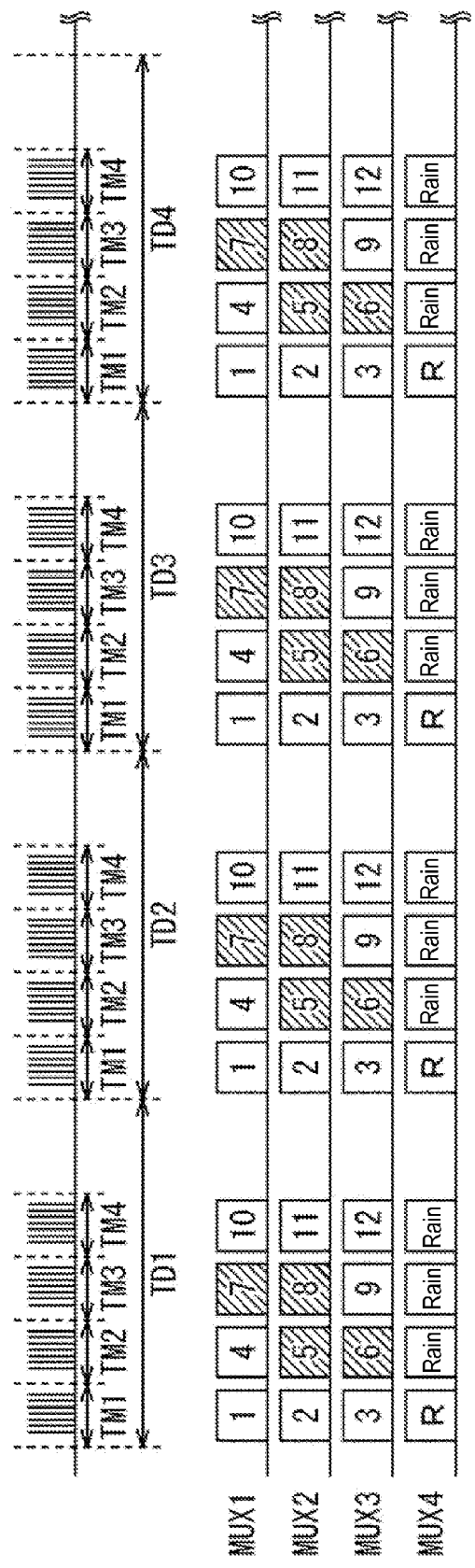
FIG. 22 is a view illustrating an example in which the light reception values are integrated over plural measurement periods.

For example, as illustrated in FIG. 22, the combination of the light receiving elements 202 selected in each measurement period is set to the pattern identical to the normal object detecting processing, and the light reception values may be integrated over the four detection periods with respect to the front-face light receiving element group. Specifically, for example, the light reception values of the light receiving elements 202-5 to 202-8 during the detection periods TD1 to TD4 may be integrated during the detection period TD4. Therefore, the integrated light reception values of the light receiving elements 202-5 to 202-8 become about four times the case of the normal object detecting processing because the integration times of the light receiving elements 202-5 to 202-8 are increased four times. According to the increase in integrated light reception value, the gains of the TIA 262 and PGA 263 corresponding to the light receiving elements 202-5 to 202-8 are set to values higher than the standard values.

In both the methods of FIGS. 15 to 20 and the method of FIG. 22, by controlling the integration times of the light reception value of each light receiving element 202, the detection sensitivity for each detection area is controlled, and the detection sensitivity for at least part of the front-face detection area group is increased. In the methods of FIGS. 15 to 20, because the light reception values are integrated more times in a short period of time, an object detection speed can be enhanced in the detection area where the detection sensitivity is increased. On the other hand, in the methods of FIG. 22, because the detection areas of other light receiving elements 202 are also continuously monitored, the detection sensitivity for the detection area in the front-face direction can be increased without decreasing the detection sensitivity for the detection areas except the front-face direction.

For example, the methods of FIGS. 15 to 20 and the method of FIG. 22 may be combined and performed.

With reference to FIG. 9, the arithmetic section 27 makes a notification of the detection result in Step S7. Specifically, the object detector 312 supplies the detection result such as the existence or non-existence of the obstacle and the position, distance, and size of the obstacle to the notification section 303, the controller 21, and the sensitivity controller 304. As needed basis, the notification section 303 supplies the detection result to the vehicle control device 12.

Then the flow returns to the processing in Step S1, and the pieces of processing in Steps S1 to S7 are repeatedly performed.

As described above, according to the existence or non-existence of the obstacle and the vehicle speed of the own vehicle, the detection sensitivity for each detection area can automatically and properly be set. Specifically, in the case where the obstacle exists, or in the case where own vehicle runs at low speed, the detection sensitivity for the front-face direction is set to a lower level, and each detection area in the monitoring area is evenly monitored. Therefore, for example, the object existing in each direction in front of the own vehicle is evenly detected, and the collision and the contact can be prevented. The obstacle can securely be tracked, or the detection of the unnecessary object can be prevented in the urban area.

On the other hand, when the own vehicle runs at high speed while the obstacle does not exist, the front-face direction of the own vehicle is intensively monitored with high sensitivity. Therefore, the vehicle in front of the own vehicle or the pedestrian crossing a street in front of the own vehicle can quickly be detected to prevent the collision or the contact, the vehicle or the pedestrian having a high risk of colliding or contacting with the own vehicle at high-speed running.

Because the light reception values of the light receiving elements 202 are integrated to detect the object, the light reception sensitivity for the reflected light can be increased, and detection accuracy of the object in the monitoring area can be improved.

The four-cycle measurement period is provided in one detection period, and the light receiving element 202 measuring the light reception value is switched, so that the necessary detection area can be monitored during one detection period while the numbers of TIAs 262, PGAs 263, and ADCs 264 are restrained. Therefore, the scale and calculation amount of the circuit necessary to measure or integrate the light reception values can be restrained.

2. Modifications

Modifications of one or more embodiments of the disclosure will be described below.

{Modifications Concerning Combination of Light Receiving Elements 202}

The combination of the light receiving elements 202 connected to the MUXs 261 and the combination of the light receiving elements 202 selected during the measurement periods are not limited to one or more embodiments of the disclosure. Modifications of the combination of the light receiving elements 202 connected to the MUXs 261 and the combination of the light receiving elements 202 selected during the measurement periods will be described below with reference to FIGS. 23 to 46.

First Modification

Figure 23:
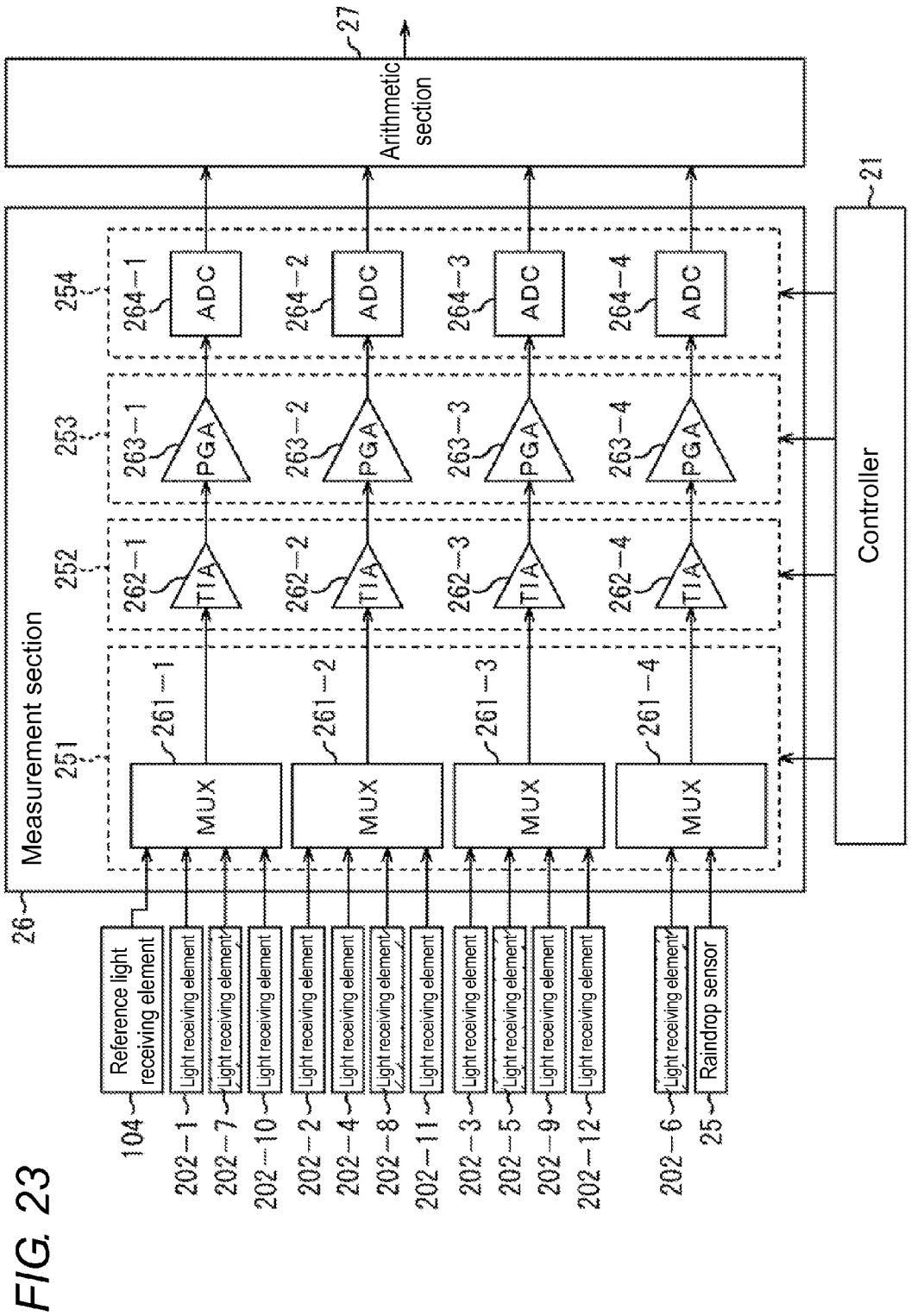
FIG. 23 is a view illustrating a first modification of the combination of the light receiving elements connected to MUXs.

FIG. 23 illustrates a first modification of the combination of the light receiving elements 202 connected to each MUX 261. Specifically, the light receiving elements 202-1, 202-7, and 202-10 and the reference light receiving element 104 are connected to the MUX 261-1, the light receiving elements 202-2, 202-4, 202-8, and 202-11 are connected to the MUX 261-2, the light receiving elements 202-3, 202-5, 202-9, and 202-12 are connected to the MUX 261-3, and the light receiving elements 202-6 and the raindrop sensor 25 are connected to the MUX 261-4.

The combination of the light receiving elements 202 in FIG. 23 differs from the combination of the light receiving elements 202 in FIG. 6 in that the light receiving elements 202-5 to 202-8 (front-face light receiving element group) are connected to the MUXs 261 different from one another, and that the raindrop sensor 25 and the reference light receiving element 104 are connected to the different MUXs 261.

Figure 24:
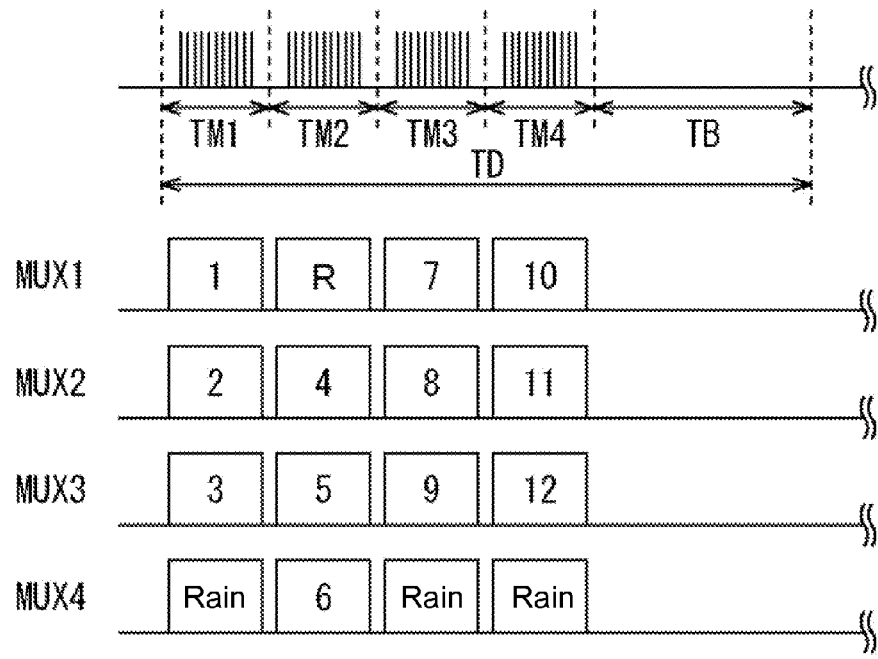
FIG. 24 is a view illustrating an example of the combination of the light receiving elements selected in each measurement period during the normal object detecting processing in the first modification of FIG. 23.

FIG. 24 illustrates an example of the combination of the light receiving elements 202 selected in each measurement period during the normal object detecting processing in the first modification of FIG. 23. In the example of FIG. 24, the light receiving elements 202-1 to 202-3 and the raindrop sensor 25 are selected during the measurement period TM1, the light receiving elements 202-4 to 202-6 and the reference light receiving element 104 are selected during the measurement period TM2, the light receiving elements 202-7 to 202-9 and the raindrop sensor 25 are selected during the measurement period TM3, and the light receiving elements 202-10 to 202-12 and the raindrop sensor 25 are selected during the measurement period TM4. Accordingly, similarly to the case in FIG. 13, the light reception values of all the light receiving elements 202 are measured during one detection period, and all the detection areas in the monitoring area are monitored.

Patterns B1 to B5 in FIGS. 25 to 29 illustrate examples of the combination of the light receiving elements 202 selected in each measurement period during the front-face priority object detecting processing in the first modification of FIG. 23. FIG. 30 illustrates the combination of the light receiving elements 202 selected during one detection period in the patterns B1 to B5 of FIGS. 25 to 29.

Figure 25:
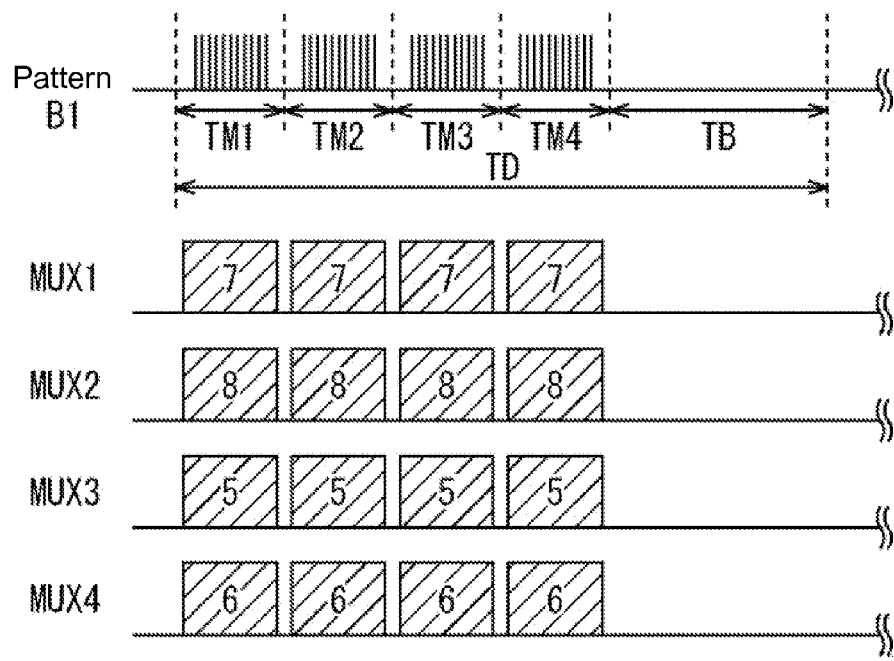
FIG. 25 is a view illustrating a first example of the combination of the light receiving elements selected in each measurement period during the front-face priority object detecting processing in the first modification of FIG. 23.
Figure 26:
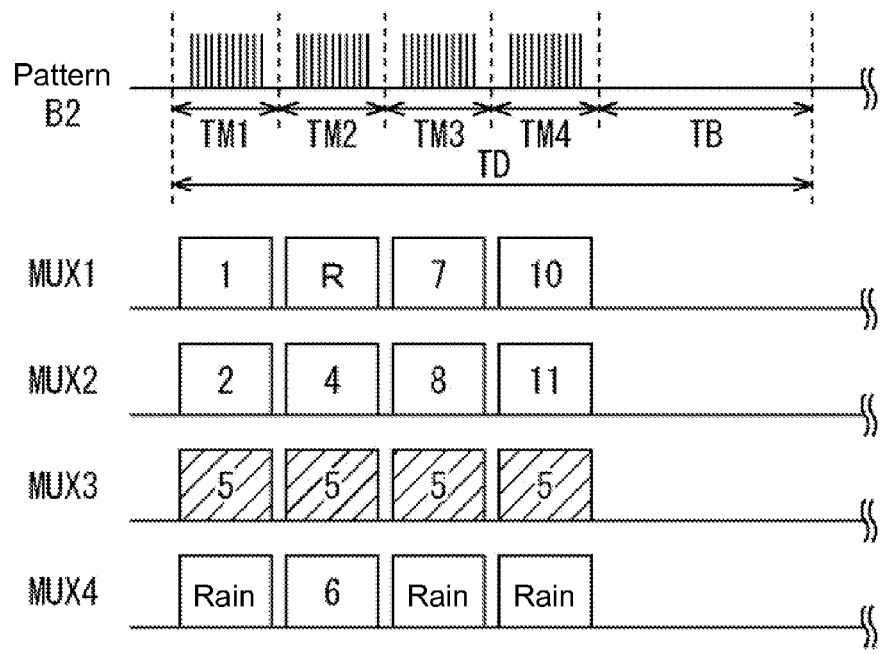
FIG. 26 is a view illustrating a second example of the combination of the light receiving elements selected in each measurement period during the front-face priority object detecting processing in the first modification of FIG. 23.
Figure 27:
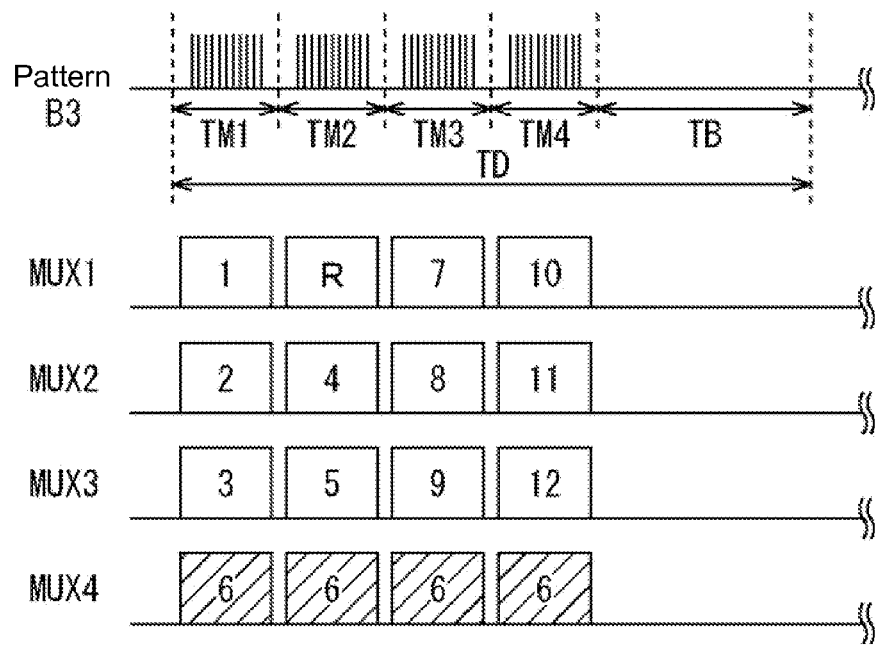
FIG. 27 is a view illustrating a third example of the combination of the light receiving elements selected in each measurement period during the front-face priority object detecting processing in the first modification of FIG. 23.
Figure 28:
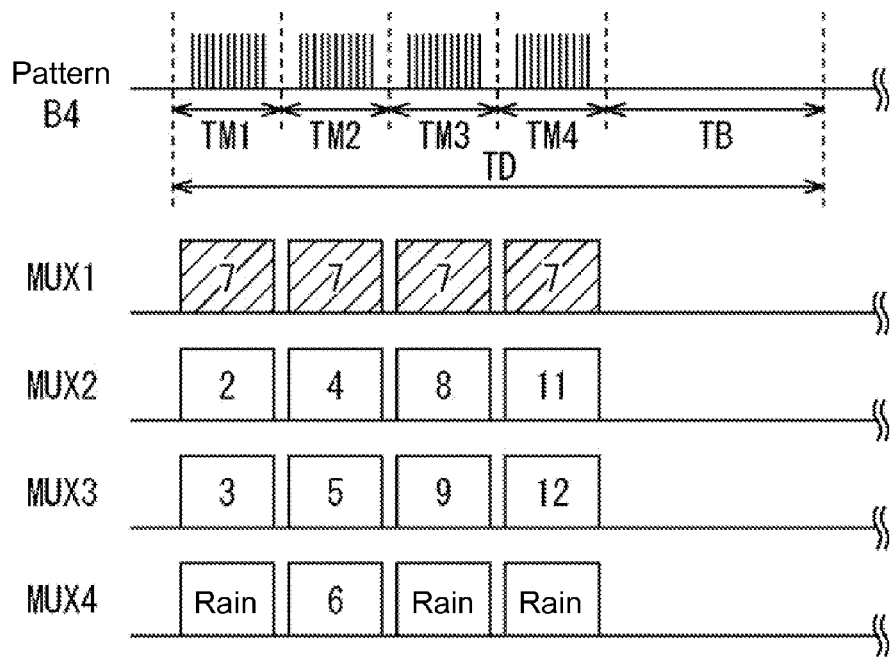
FIG. 28 is a view illustrating a fourth example of the combination of the light receiving elements selected in each measurement period during the front-face priority object detecting processing in the first modification of FIG. 23.
Figure 29:
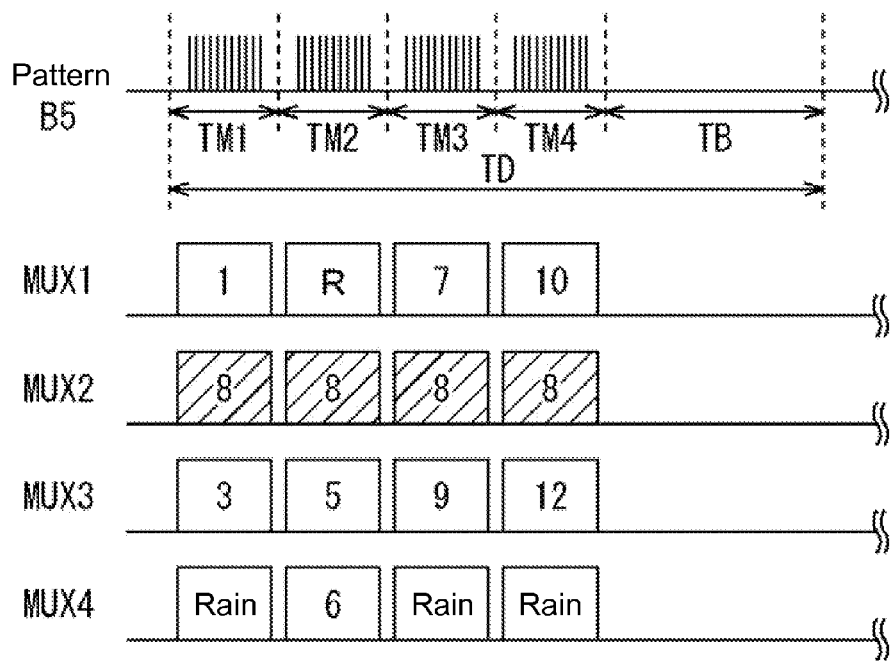
FIG. 29 is a view illustrating a fifth example of the combination of the light receiving elements selected in each measurement period during the front-face priority object detecting processing in the first modification of FIG. 23.

The pattern B1 in FIG. 25 differs from that of the normal object detecting processing of FIG. 24 in that the light receiving elements 202-5 to 202-8 (front-face light receiving element group) are selected over the measurement periods TM1 to TM4. Therefore, the integrated light reception values of the light receiving elements 202-5 to 202-8 become about four times the case of the normal object detecting processing.

As illustrated in FIG. 30, in the pattern B1, only the front-face direction of the own vehicle is intensively monitored with high sensitivity similarly to the patterns A1a in FIG. 15 and the pattern A1b in FIG. 16.

Particularly, in the pattern B1, the wider range in the front-face direction can intensively be monitored with high sensitivity compared with the patterns A1a and A1b.

The patterns B2 to B5 in FIGS. 26 to 29 differ from the pattern of the normal object detecting processing of FIG. 24 in that one of the light receiving elements 202-5 to 202-8 (front-face light receiving element group) is selected over the measurement periods TM1 to TM4. Therefore, the integrated light reception value of one of the light receiving elements 202-5 to 202-8 becomes about four times the case of the normal object detecting processing.

As illustrated in FIG. 30, in the patterns B2 to B5, similarly to the patterns A2 to A5 in FIGS. 17 to 20, part of the front-face direction of the own vehicle is intensively monitored with high sensitivity, and directions except the front-face direction are also continuously monitored. Particularly, in the pattern B3, other detection areas except the intensively-monitored detection area A6 can also continuously be monitored.

Second Modification

Figure 31:
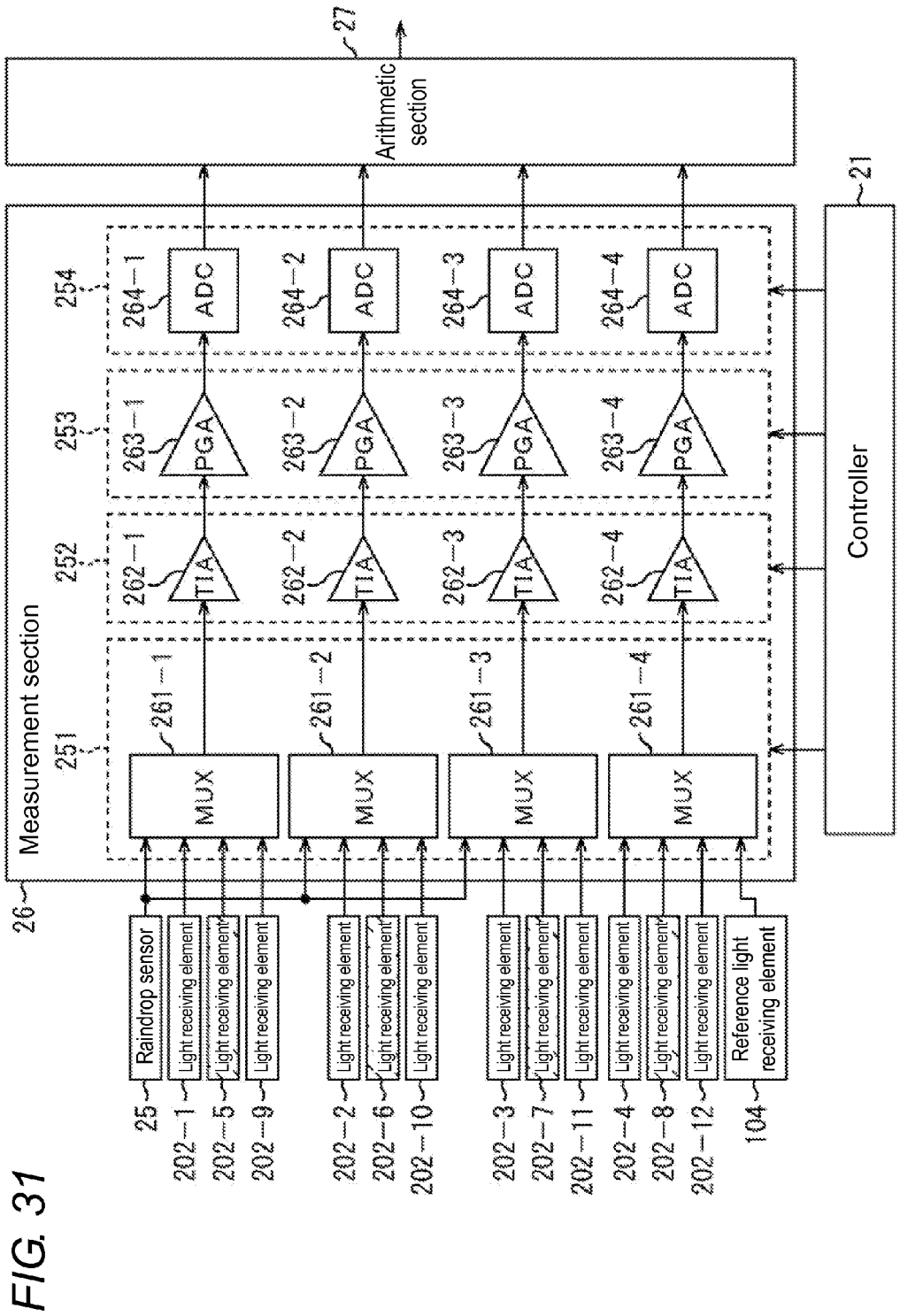
FIG. 31 is a view illustrating a second modification of the combination of the light receiving elements connected to MUXs.

FIG. 31 illustrates a second modification of the combination of the light receiving elements 202 connected to each MUX 261. Specifically, the light receiving elements 202-1, 202-5, and 202-9 are connected to the MUX 261-1, the light receiving elements 202-2, 202-6, and 202-10 are connected to the MUX 261-2, the light receiving elements 202-3, 202-7, and 202-11 are connected to the MUX 261-3, and the light receiving elements 202-4, 202-8, and 202-12 are connected to the MUX 261-4. The raindrop sensor 25 is connected to the MUXs 261-1, 261-2, and 261-3. The reference light receiving element 104 is connected to the MUX 261-4.

The combination of the light receiving elements 202 in FIG. 31 differs largely from the combination of the light receiving elements 202 in FIG. 23 in that three light receiving elements 202 are connected to each of all the MUXs 261, and that the raindrop sensor 25 is connected to the three MUXs 261.

Figure 32:
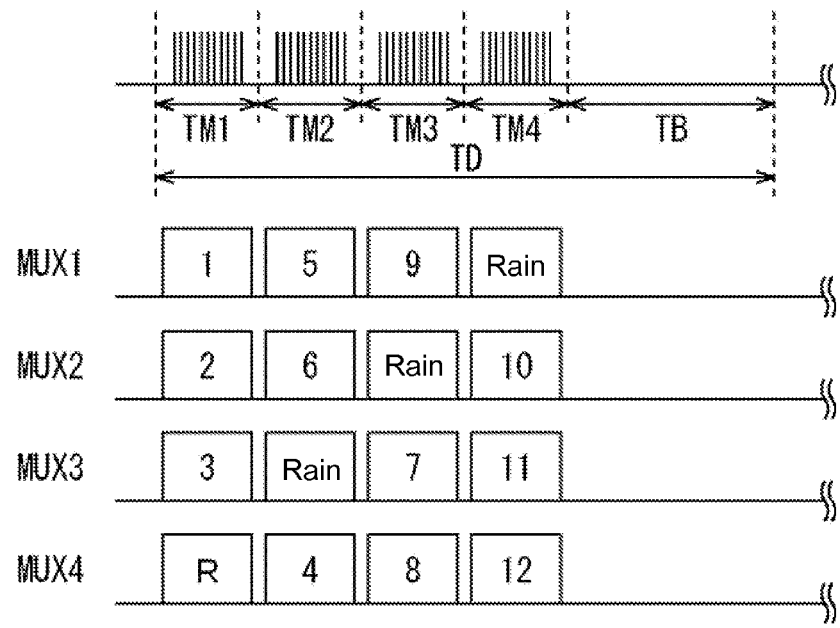
FIG. 32 is a view illustrating an example of the combination of the light receiving elements selected in each measurement period during the normal object detecting processing in the second modification of FIG. 31.

FIG. 32 illustrates an example of the combination of the light receiving elements 202 selected in each measurement period during the normal object detecting processing in the second modification of FIG. 31. In the example of FIG. 32, the light receiving elements 202-1 to 202-3 and the reference light receiving element 104 are selected during the measurement period TM1, the light receiving elements 202-4 to 202-6 and the raindrop sensor 25 are selected during the measurement period TM2, the light receiving elements 202-7 to 202-9 and the raindrop sensor 25 are selected during the measurement period TM3, and the light receiving elements 202-10 to 202-12 and the raindrop sensor 25 are selected during the measurement period TM4. Accordingly, similarly to the cases in FIGS. 13 and 24, the light reception values of all the light receiving elements 1 are measured during one detection period, and all the detection areas in the monitoring area are monitored.

Patterns C1 to C5 in FIGS. 33 to 37 illustrate examples of the combination of the light receiving elements 202 selected in each measurement period during the front-face priority object detecting processing in the second modification of FIG. 31. FIG. 38 illustrates the combination of the light receiving elements 202 selected during one detection period in the patterns C1 to C5 of FIGS. 33 to 37.

Figure 33:
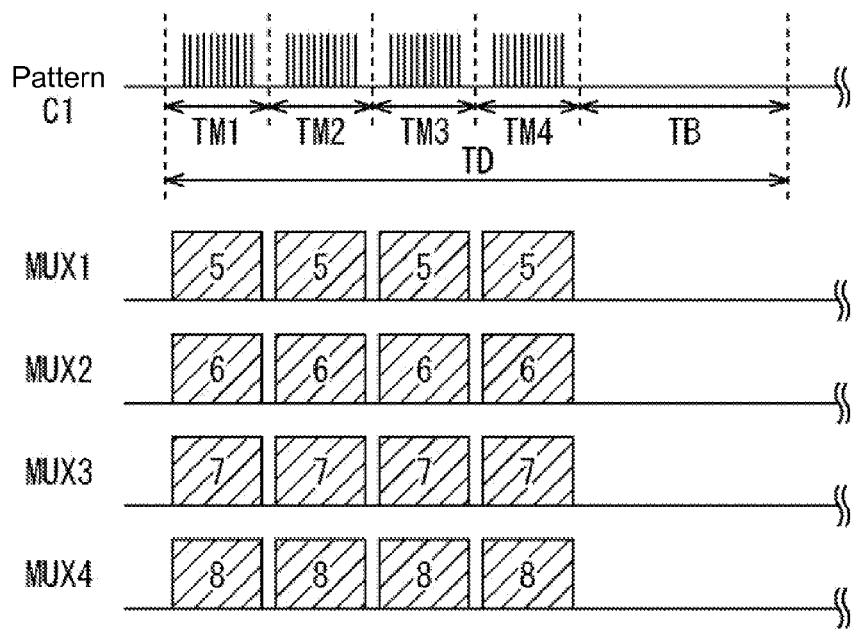
FIG. 33 is a view illustrating a first example of the combination of the light receiving elements selected in each measurement period during the front-face priority object detecting processing in the second modification of FIG. 31.
Figure 34:
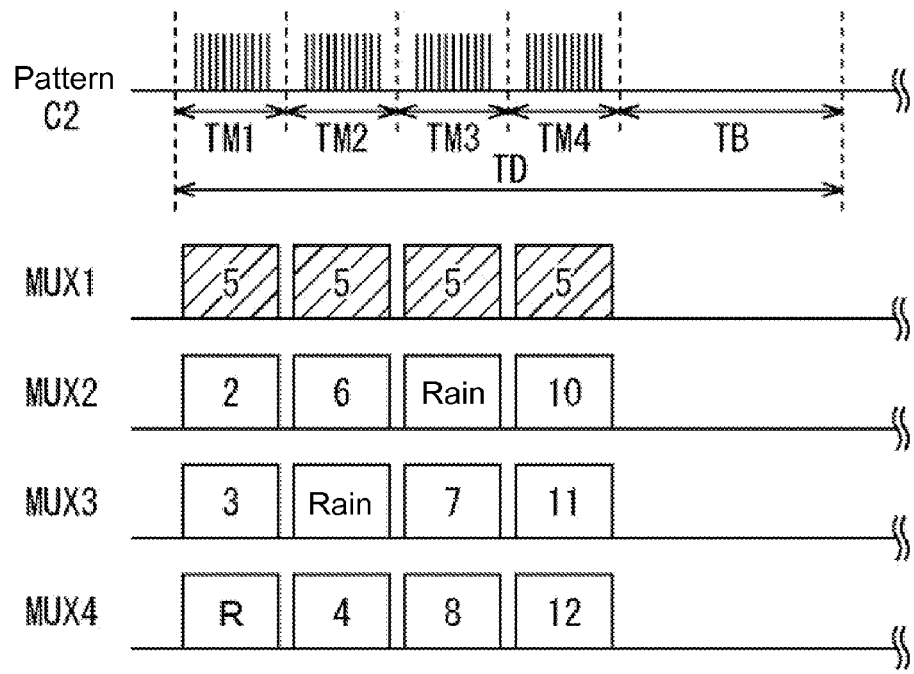
FIG. 34 is a view illustrating a second example of the combination of the light receiving elements selected in each measurement period during the front-face priority object detecting processing in the second modification of FIG. 31.
Figure 35:
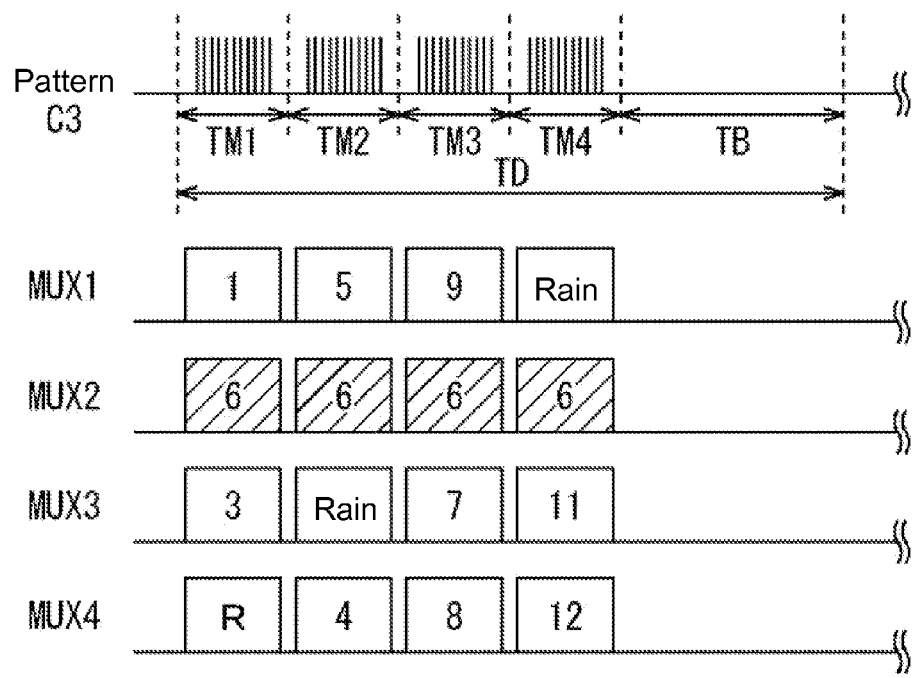
FIG. 35 is a view illustrating a third example of the combination of the light receiving elements selected in each measurement period during the front-face priority object detecting processing in the second modification of FIG. 31.
Figure 36:
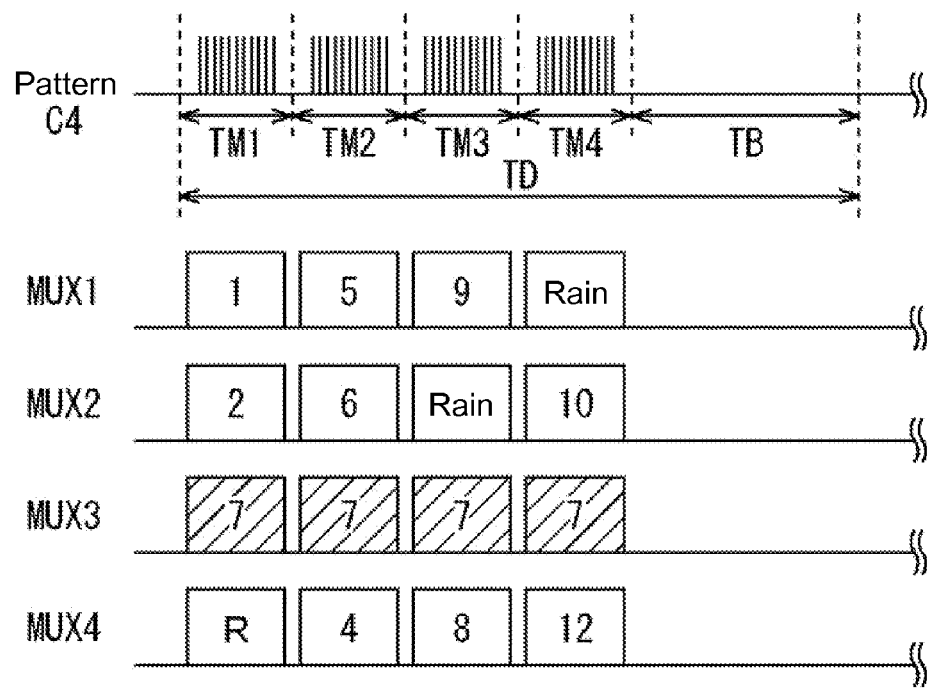
FIG. 36 is a view illustrating a fourth example of the combination of the light receiving elements selected in each measurement period during the front-face priority object detecting processing in the second modification of FIG. 31.
Figure 37:
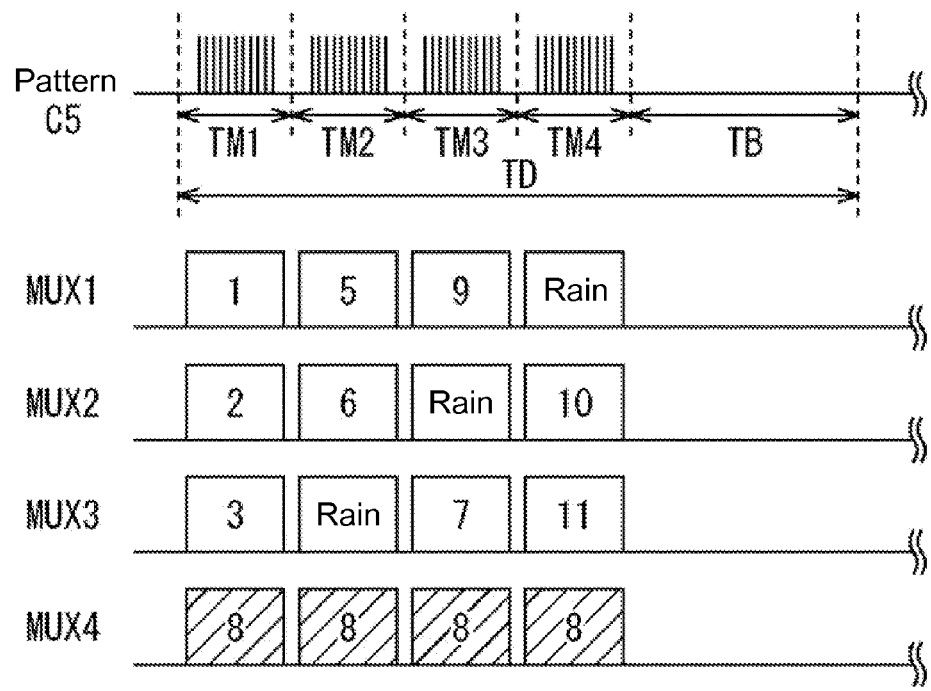
FIG. 37 is a view illustrating a fifth example of the combination of the light receiving elements selected in each measurement period during the front-face priority object detecting processing in the second modification of FIG. 31.

The pattern C1 in FIG. 33 differs from that of the normal object detecting processing of FIG. 32 in that the light receiving elements 202-5 to 202-8 (front-face light receiving element group) are selected over the measurement periods TM1 to TM4. Therefore, the integrated light reception values of the light receiving elements 202-5 to 202-8 become about four times the case of the normal object detecting processing.

As illustrated in FIG. 38, in the pattern C1, only the front-face direction of the own vehicle is intensively monitored with high sensitivity similarly to the pattern B1 in FIG. 24.

The patterns C2 to C5 in FIGS. 34 to 37 differ from the pattern of the normal object detecting processing of FIG. 32 in that one of the light receiving elements 202-5 to 202-8 (front-face light receiving element group) is selected over the measurement periods TM1 to TM4. Therefore, the integrated light reception value of one of the light receiving elements 202-5 to 202-8 becomes about four times the case of the normal object detecting processing.

As illustrated in FIG. 38, in the patterns C2 to C5, similarly to the patterns A2 to A5 in FIGS. 17 to 20 and the patterns B2 to B5 in FIGS. 26 to 29, part of the front-face direction of the own vehicle is intensively monitored with high sensitivity, and directions except the front-face direction are also continuously monitored. Particularly, in the patterns C2 to C5, the number of detection areas where the monitoring is stopped can be restrained to two even if any pattern is selected.

Third Modification

Figure 39:
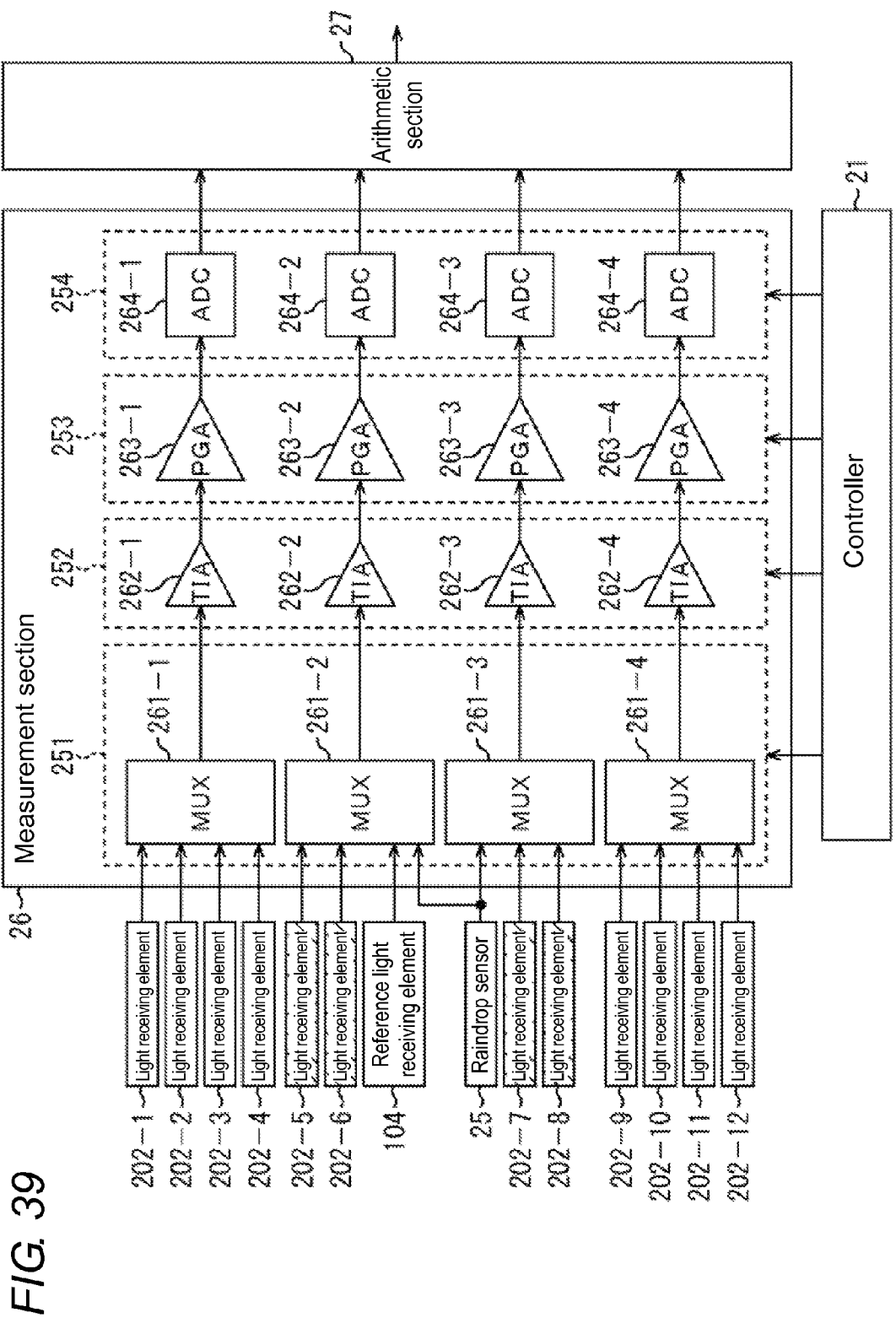
FIG. 39 is a view illustrating a third modification of the combination of the light receiving elements connected to MUXs.

FIG. 39 illustrates a third modification of the combination of the light receiving elements 202 connected to each MUX 261. Specifically, the light receiving elements 202-1 to 202-4 are connected to the MUX 261-1, the light receiving elements 202-5 and 202-6 are connected to the MUX 261-2, the light receiving elements 202-7 and 202-8 are connected to the MUX 261-3, and the light receiving elements 202-9 to 202-12 are connected to the MUX 261-4. The raindrop sensor 25 is connected to the MUXs 261-2 and 261-3. The reference light receiving element 104 is connected to the MUX 261-2.

The combination of the light receiving elements 202 in FIG. 39 differs largely from the combinations of the light receiving elements 23 in FIGS. 6, 23, and 31 in that the light receiving elements 202 adjacent to each other are connected to the identical MUX 261, and that each two light receiving elements 202 are connected to the MUXs 261-2 and 261-3.

Figure 40:
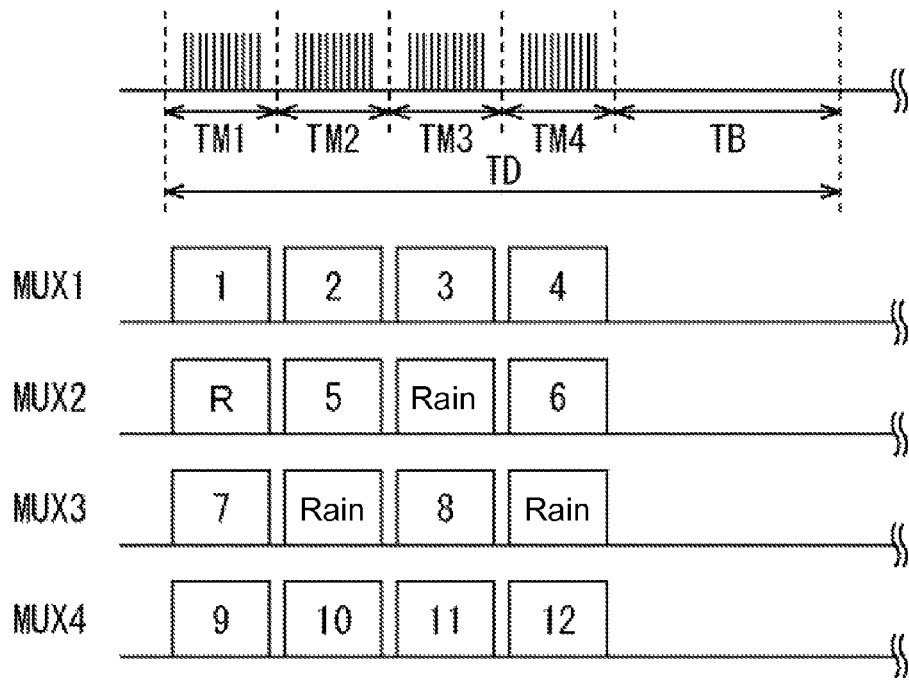
FIG. 40 is a view illustrating an example of the combination of the light receiving elements selected in each measurement period during the normal object detecting processing in the third modification of FIG. 39.

FIG. 40 illustrates an example of the combination of the light receiving elements 202 selected in each measurement period during the normal object detecting processing in the third modification of FIG. 39. The light receiving elements 202-1, 202-7, and 202-9 and the reference light receiving element 104 are selected during the measurement period TM1, the light receiving elements 202-2, 202-5, and 202-10 and the raindrop sensor 25 are selected during the measurement period TM2, the light receiving elements 202-3, 202-8, and 202-11 and the raindrop sensor 25 are selected during the measurement period TM3, and the light receiving elements 202-4, 202-6, and 202-12 and the raindrop sensor 25 are selected during the measurement period TM4. Accordingly, in the example of FIG. 40, similarly to the cases in FIGS. 13, 24, and 32, the light reception values of all the light receiving elements 202 are measured during one detection period, and all the detection areas in the monitoring area are monitored.

Patterns D1 to D5 in FIGS. 41 to 45 illustrate examples of the combination of the light receiving elements 202 selected in each measurement period during the front-face priority object detecting processing in the third modification of FIG. 40. FIG. 46 illustrates the combination of the light receiving elements 202 selected during one detection period in the patterns D1 to D5 of FIGS. 41 to 45.

Figure 41:
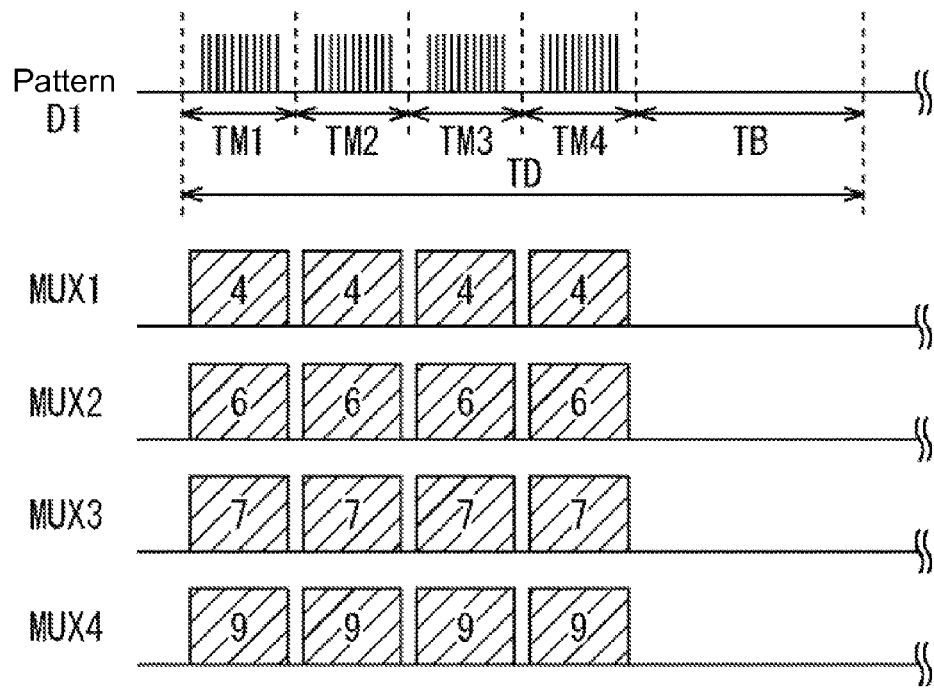
FIG. 41 is a view illustrating a first example of the combination of the light receiving elements selected in each measurement period during the front-face priority object detecting processing in the third modification of FIG. 39.
Figure 42:
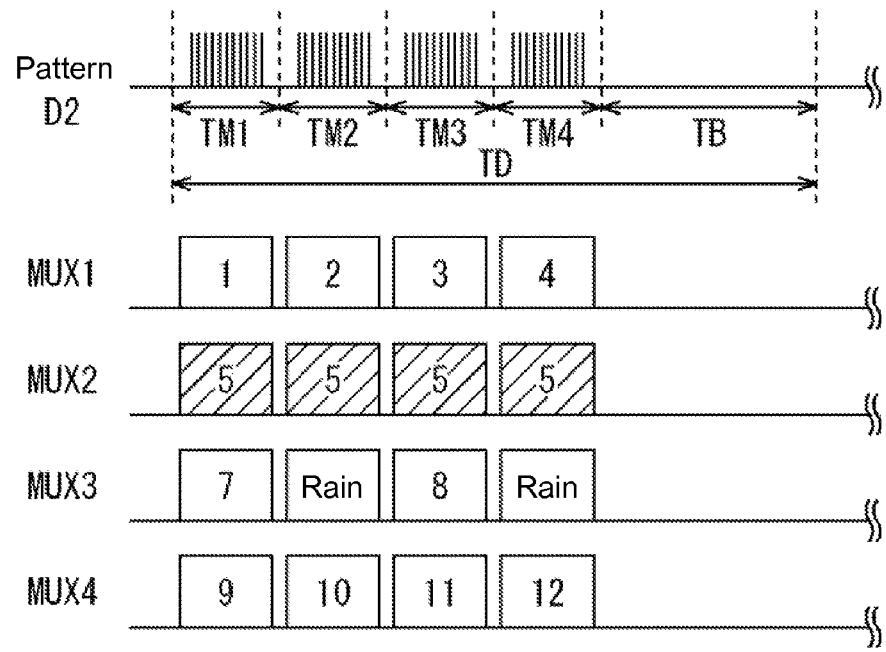
FIG. 42 is a view illustrating a second example of the combination of the light receiving elements selected in each measurement period during the front-face priority object detecting processing in the third modification of FIG. 39.
Figure 43:
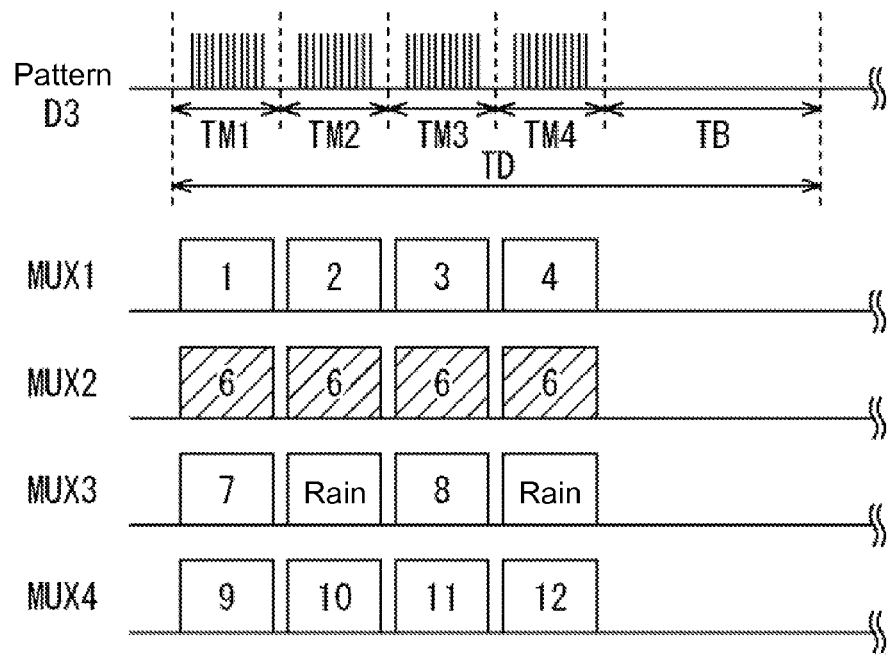
FIG. 43 is a view illustrating a third example of the combination of the light receiving elements selected in each measurement period during the front-face priority object detecting processing in the third modification of FIG. 39.
Figure 44:
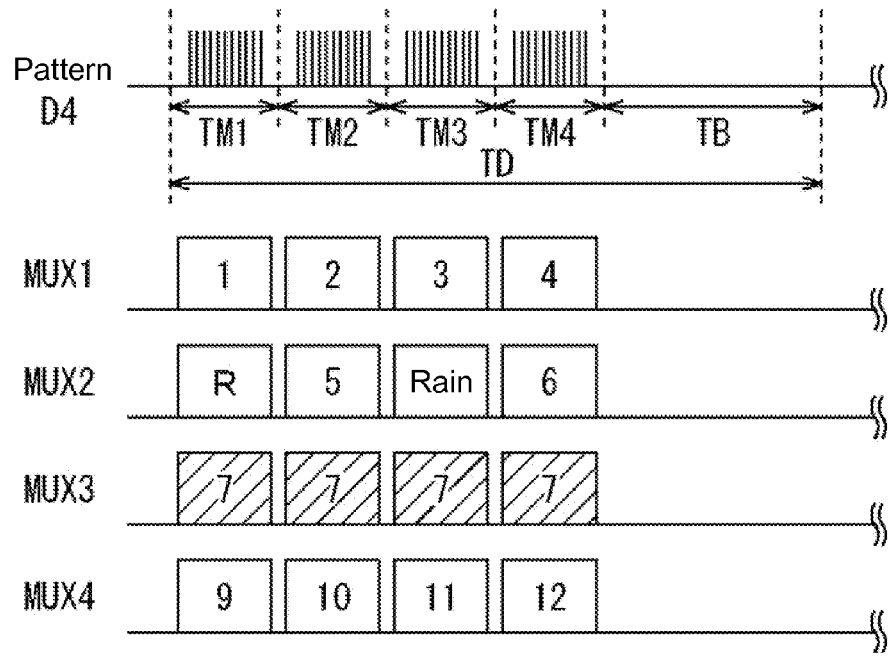
FIG. 44 is a view illustrating a fourth example of the combination of the light receiving elements selected in each measurement period during the front-face priority object detecting processing in the third modification of FIG. 39.
Figure 45:
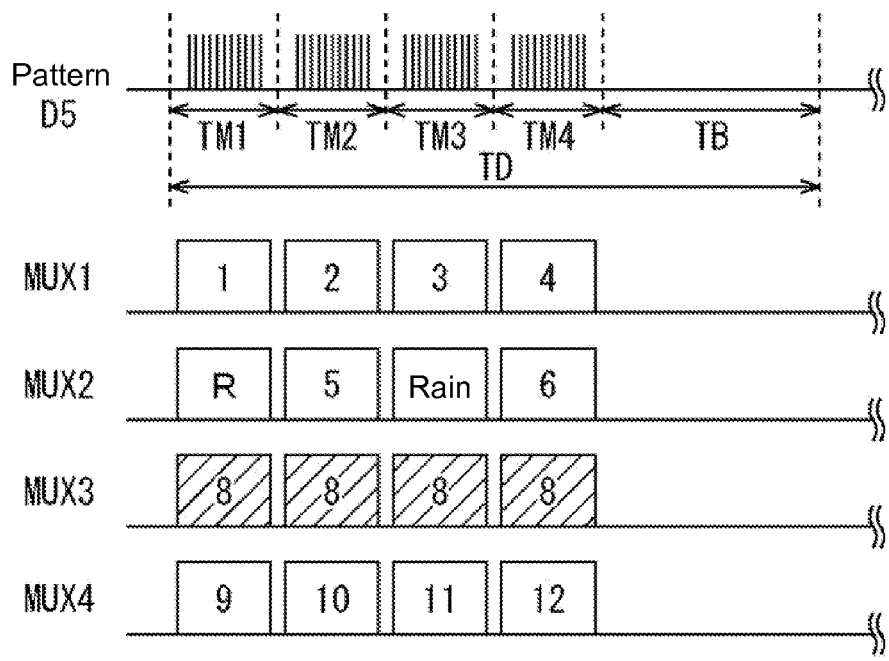
FIG. 45 is a view illustrating a fifth example of the combination of the light receiving elements selected in each measurement period during the front-face priority object detecting processing in the third modification of FIG. 39.

The pattern D1 in FIG. 41 differs from that of the normal object detecting processing of FIG. 40 in that the MUXs 261-1 to 261-4 select only the light receiving elements 202-4, 202-6, 202-7, and 202-9 over the measurement periods TM1 to TM4. Therefore, the integrated light reception values of the light receiving elements 202-4, 202-6, 202-7, and 202-9 become about four times the case of the normal object detecting processing. Additionally, during the measurement periods TM1 to TM4, the controller 1 sets the gains of the TIA 262 and PGA 263 corresponding to the light receiving elements 202-4, 202-6, 202-7, and 202-9 to values higher than the standard values.

As illustrated in FIG. 46, in the pattern D1, the detection areas A4 and A9 are intensively monitored with high sensitivity in addition to the detection areas A6 and A7 in the center of the front face, the detection areas A4 and A9 being located near the front-face detection area group and separated from the detection areas A6 and A7 with a predetermined gap. Therefore, for example, because usually the reflectors exist near right and left ends in the rear portion of the vehicle as illustrated in FIG. 14, the detection accuracy of the reflectors and the detection speed of the vehicle in front of the own vehicle are improved. As a result, the vehicle in front of the own vehicle can more quickly and securely be detected.

The patterns D2 to D5 in FIGS. 42 to 45 differ from the pattern of the normal object detecting processing of FIG. 40 in that one of the light receiving elements 202-5 to 202-8 (front-face light receiving element group) is selected over the measurement periods TM1 to TM4. Therefore, the integrated light reception value of one of the light receiving elements 202-5 to 202-8 becomes about four times the case of the normal object detecting processing.

As illustrated in FIG. 46, in the patterns D2 to D5, similarly to the patterns A2 to A5 in FIGS. 17 to 20, the patterns B2 to B5 in FIGS. 26 to 29, and the patterns C2 to C5 in FIGS. 34 to 37, part of the front-face direction of the own vehicle is intensively monitored with high sensitivity, and directions except the front-face direction are also continuously monitored. Particularly, in the patterns D2 to D5, the number of detection areas where the monitoring is stopped can be restrained to one even if any pattern is selected.

The combinations of the light receiving elements 202 connected to the MUXs 261 and the combinations of the light receiving elements 202 selected in the measurement periods are illustrated only by way of example, and are able to be changed as needed basis. For example, the number of light receiving elements 202 (that is, the number of intensively-monitored detection areas), which are selected over the measurement periods TM1 to TM4 during the front-face priority object detecting processing, may be set to two or three. For example, it is not always necessary that the light receiving elements 202 corresponding to the intensively-monitored detection area be set over the measurement periods TM1 to TM4, but the light receiving elements 202 may be selected in two or three measurement periods.

For example, the pattern of the combination of the light receiving elements 202 selected during the front-face priority object detecting processing is not fixed, but the pattern may be changed in units of detection periods. For example, at least two of the patterns A1a to A5 may be changed in each predetermined detection period. For example, the pattern of the combination of the light receiving elements 202 of the normal object detecting processing may be mixed during the front-face priority object detecting processing.

{Modifications Concerning Configuration of Laser Radar Device 11}

The configuration of the laser radar device 11 is not limited to the example in FIG. 1, but can be changed as needed basis.

For example, the controller 21 and the arithmetic section 27 can be integrated, or functional allocations of the controller 21 and arithmetic section 27 can be changed.

For example, the numbers of light receiving elements 202, MUXs 261, TIAs 262, PGAs 263, and ADCs 264 can be increased or decreased as needed basis.

For example, by increasing the number of light receiving elements 202, the monitoring area can be widened, or the detection area in the monitoring area can more finely be divided. On the other hand, by decreasing the number of light receiving elements 202, the monitoring area can be narrowed, or the detection areas in the monitoring area can be consolidated.

For example, the number of concurrently-sampled light reception signals can be increased or decreased by changing the number of combinations of the MUXs 261, TIAs 262, PGAs 263, and ADCs 264.

In the above description, by way of example, the object detecting processing is performed once in each detection period. Alternatively, for example, the light reception values are integrated over at least two detection periods as needed basis, and the object detecting processing may be performed once in at least two detection periods.

The number of measurement period cycles during one detection period can be set to any numerical value.

In the object detecting processing of FIG. 10, by way of example, the peak light reception value is detected after the four-cycle measurement period. Alternatively, for example, every time the measurement period of each cycle is ended, the peak may be detected in parallel with the next-cycle measurement period. In the example of FIG. 13, the peaks of the light receiving elements 202-1 to 202-3 in which the integrated light reception value is measured during the measurement period TM1 may be detected during the measurement period TM2. In this case, the peaks of the three light receiving elements 202 can individually be detected in parallel.

{Modification of Application of the Disclosure}

For example, the disclosure can also be applied to a laser radar device in which the MUX 261 is not provided, but the TIA 262, the PGA 263, and the ADC 264 are provided as many as the light receiving elements 202 to be able to measure the light reception values of all the light receiving elements during one measurement period.

[Configuration Example of Computer]

The above sequence of pieces of processing can be performed by hardware or software. In the case where the sequence of pieces of processing is performed by software, a program constituting the software is installed on a computer. Examples of the computer include a computer incorporated in dedicated hardware and a general-purpose personal computer that can perform various functions by installing various programs.

Figure 47:
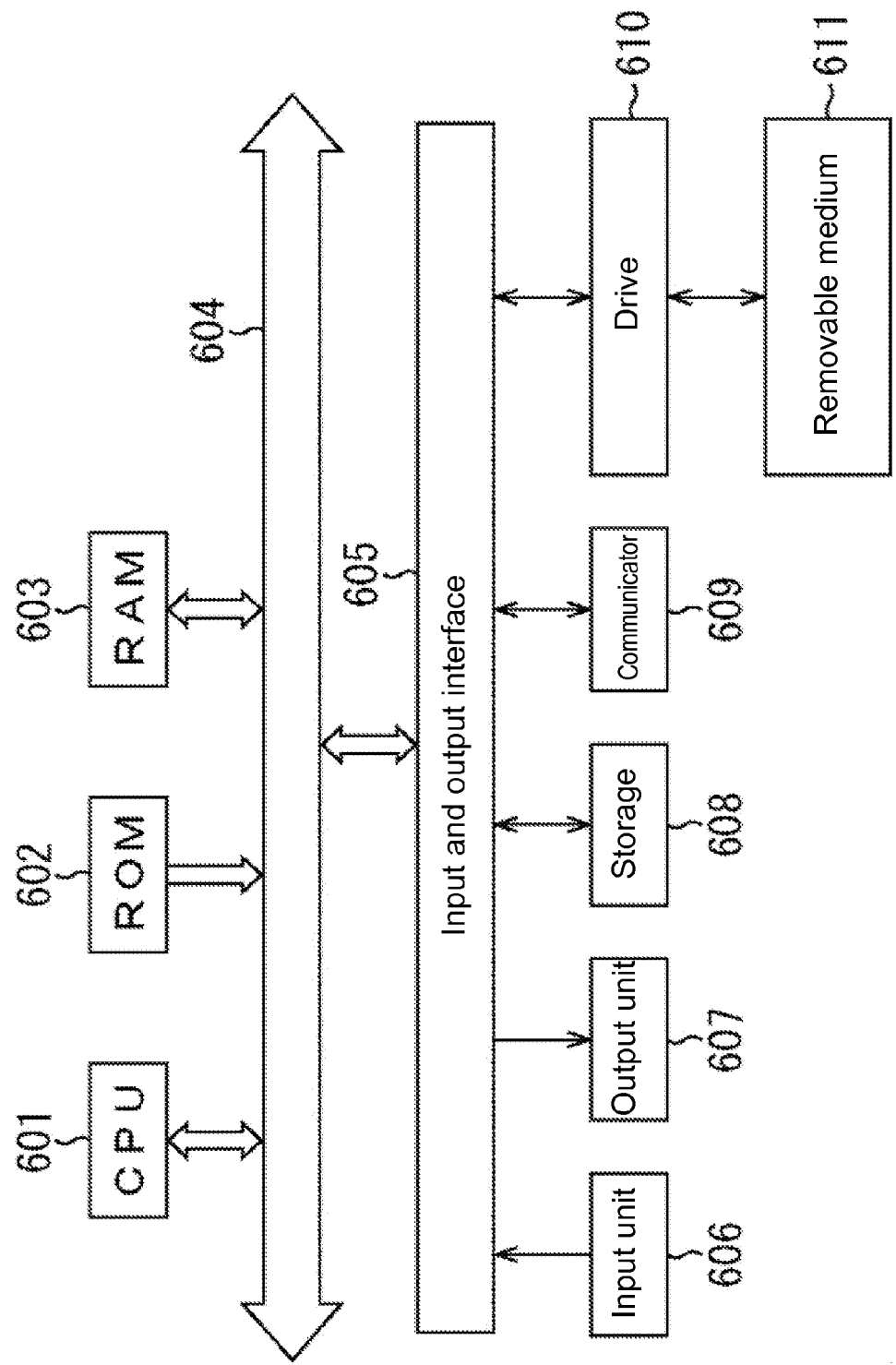
FIG. 47 is a block diagram illustrating a configuration example of a computer.

FIG. 47 is a block diagram illustrating a hardware configuration example of the computer that performs the sequence of pieces of processing using the program.

In the computer, a CPU (Central Processing Unit) 601, a ROM (Read Only Memory) 602, a RAM (Random Access Memory) 603 are connected to one another through a bus 604.

An input and output interface 605 is also connected to the bus 604. An input section 606, an output section 607, a storage 608, a communicator 609, and a drive 610 are connected to the input and output interface 605.

For example, the input section 606 is constructed with a keyboard, a mouse, and a microphone. For example, the output section 607 is constructed with a display and a speaker. For example, the storage 608 is constructed with a hard disk and a nonvolatile memory. For example, the communicator 609 is constructed with a network interface. The drive 610 drives a removable medium 611 such as a magnetic disk, an optical disk, a magneto-optical disk, and a semiconductor memory.

In the computer having the above configuration, for example, the CPU 601 loads the program stored in the storage 608 on the RAM 603 through the input and output interface 605 and the bus 604, to perform the sequence of pieces of processing.

For example, the program executed by the computer (CPU 601) can be provided while recorded in the removable medium 611 as a package medium. The program can also be provided through a wired or wireless transmission medium such as a local area network, the Internet, and a digital satellite broadcasting.

In the computer, the program can be installed on the storage 608 through the input and output interface 605 by placing the removable medium 611 on the drive 610. The program can also be received by the communicator 609 through the wired or wireless transmission medium, and installed on the storage 608. The program can previously be installed on the ROM 602 or the storage 608.

The program executed by the computer may be a program in which the processing is performed in time series along the order described in one or more embodiments of the disclosure, a program in which the pieces of processing are performed in parallel, or a program in which the processing is performed in necessary timing such as a call.

While the disclosure has been described with reference to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A laser radar device configured to monitor a forward direction of a vehicle, the laser radar device comprising:
   a projector configured to project measuring light that is of a pulsed laser beam to the forward direction of the vehicle a plurality of times during a detection period having a first predetermined length;
   a plurality of light receiving elements configured to receive reflected light of the measuring light from a plurality of detection areas having different directions in a horizontal direction, the plurality of light receiving elements including a light receiving element group configured to receive the reflected light from a detection area group in front of a front face of the vehicle;
   a measurement section configured to select at least one of light reception signals from the light receiving elements and to measure a light reception value by sampling the selected light reception signal;

an integrator configured to integrate the light reception values of the light reception signals from the identical light receiving element at an identical sampling clock time, the light reception values being sampled during the detection period;

a detector configured to detect an obstacle in each detection period based on the integrated light reception value; and a sensitivity controller configured to increase the number of times of integrating the light reception values of at least a part of the light receiving element group, when the detector does not detect the obstacle and when speed of the vehicle is greater than or equal to a predetermined threshold based on externally-input information.

2. The laser radar device according to claim 1, wherein the sensitivity controller increases the number of times at which the measurement section selects the light reception signal from at least a part of the light receiving element group during the detection period, when the detector does not detect the obstacle and when the speed of the vehicle is greater than or equal to the predetermined threshold based on the externally-input information.

3. The laser radar device according to claim 2,
wherein the projector repeats processing of projecting the measuring light a plurality of times during a measurement period having a second predetermined length a plurality of cycles during the detection period,
wherein the measurement section selects the light reception signal in each measurement period, and
wherein the sensitivity controller increases the number of times at which the measurement section selects the light reception signal from at least a part of the light receiving element group during the detection period, when the detector does not detect the obstacle and when the speed of the vehicle is greater than or equal to the predetermined threshold based on the externally-input information.

4. The laser radar device according to claim 1, wherein the sensitivity controller integrates the light reception values of at least a part of the light receiving element group over the plurality of detection periods, when the detector does not detect the obstacle and when the speed of the vehicle is greater than or equal to the predetermined threshold based on the externally-input information.

5. The laser radar device according to claim 1, wherein the sensitivity controller increases a gain amplifying the light reception signal from at least a part of the light receiving element group, when the detector does not detect the obstacle and when the speed of the vehicle is greater than or equal to the predetermined threshold based on the externally-input information.

6. The laser radar device according to claim 1, wherein the sensitivity controller increases sensitivity for the detection area near the detection area group, when the detector does not detect the obstacle and when the speed of the vehicle is greater than or equal to the predetermined threshold based on the externally-input information.

7. An object detecting method for a laser radar device configured to monitor a forward direction of a vehicle,
the object detecting method comprising the steps of:
projecting measuring light that is of a pulsed laser beam to the forward direction of the vehicle a plurality of times during a detection period having a predetermined length;
receiving reflected light of the measuring light from a plurality of detection areas having different directions in a horizontal direction using a plurality of light receiving elements, the light receiving elements including a light receiving element group configured to receive the reflected light from a detection area group in front of a front face of the vehicle;
selecting at least one of light reception signals from the light receiving elements and measuring a light reception value by sampling the selected light reception signal;
integrating the light reception values of the light reception signals from the identical light receiving element at an identical sampling clock time, the light reception values being sampled during the detection period;
detecting an obstacle in each detection period based on the integrated light reception value; and
increasing the number of times of integrating the light reception values of at least a part of the light receiving element group, when the obstacle is not detected through processing in the detection step and when speed of the vehicle is greater than or equal to a predetermined threshold based on externally-input information.

* * * * *